US007146677B2

(12) United States Patent
Litomisky et al.

(10) Patent No.: US 7,146,677 B2
(45) Date of Patent: Dec. 12, 2006

(54) ENERGY SAVING VACUUM SYSTEM FOR PARTICLE, MIST, AND FUME COLLECTION

(76) Inventors: Ivan Litomisky, 5656 Pine Cone Rd., La Crescenta, CA (US) 91214; Petr Litomisky, 1954 Canyon Dr., Los Angeles, CA (US) 90068; Ales Litomisky, 5656 Pine Cone Rd., La Crescenta, CA (US) 91214

(*) Notice: Subject to any disclaimer, the term of this patent is extended or adjusted under 35 U.S.C. 154(b) by 440 days.

(21) Appl. No.: 10/300,179

(22) Filed: Nov. 19, 2002

(65) Prior Publication Data

US 2004/0093682 A1 May 20, 2004

(51) Int. Cl.
A47L 5/38 (2006.01)
F23J 1/00 (2006.01)

(52) U.S. Cl. .......................... 15/301; 15/314

(58) Field of Classification Search .............. 15/301, 15/314, 331, 339; 137/240; 251/81, 129.11, 251/301, 302
See application file for complete search history.

(56) References Cited

U.S. PATENT DOCUMENTS

| | | | | |
|---|---|---|---|---|
| 1,048,477 | A | * 12/1912 | Allington | .................. 406/117 |
| 1,798,952 | A | * 3/1931 | Pellegrino | .................. 251/112 |
| 3,286,980 | A | * 11/1966 | Audrey | ...................... 251/302 |
| 5,836,336 | A | * 11/1998 | Warzecha | ................ 137/15.23 |
| 6,012,199 | A | 1/2000 | Litomisky et al. | ............ 15/301 |
| 6,089,537 | A | * 7/2000 | Olmsted | ................ 251/129.11 |
| 6,691,981 | B1 | * 2/2004 | Hart | .......................... 251/302 |

* cited by examiner

Primary Examiner—Terrence R. Till
(74) Attorney, Agent, or Firm—Cislo & Thomas, LLP

(57) ABSTRACT

An improved energy-efficient vacuum system for machine shop dust, particulate matter, and the like. Blast gates, including large-diameter blast gates, control the flow of vacuum generated by a dust collector to individual machines that may or may not accommodate vacuum ductwork and the like. The blast gate has a rotating blade inside a chassis with a DC motor effectively using a slip clutch, an increased current feedback system, a biasing-spring assembly or otherwise to limit the rotation driving of the rotating blade. In one embodiment, the blast gate blade bears teeth about its perimeter. The DC motor engages the perimeter blade teeth with a gear. Greater mechanical advantage is achieved over the blast gate blade and less torque arises in contrast to a driving system located at the blade's central pivot point. Additionally, sensing apparatus or system calculation allow the dust collecting vacuum system to operate in an energy-efficient manner. By supplying only the vacuum needed to collect present dust, energy is saved in comparison with a dust collection system operating continuously at full capacity.

18 Claims, 19 Drawing Sheets

8 greenBOX Master

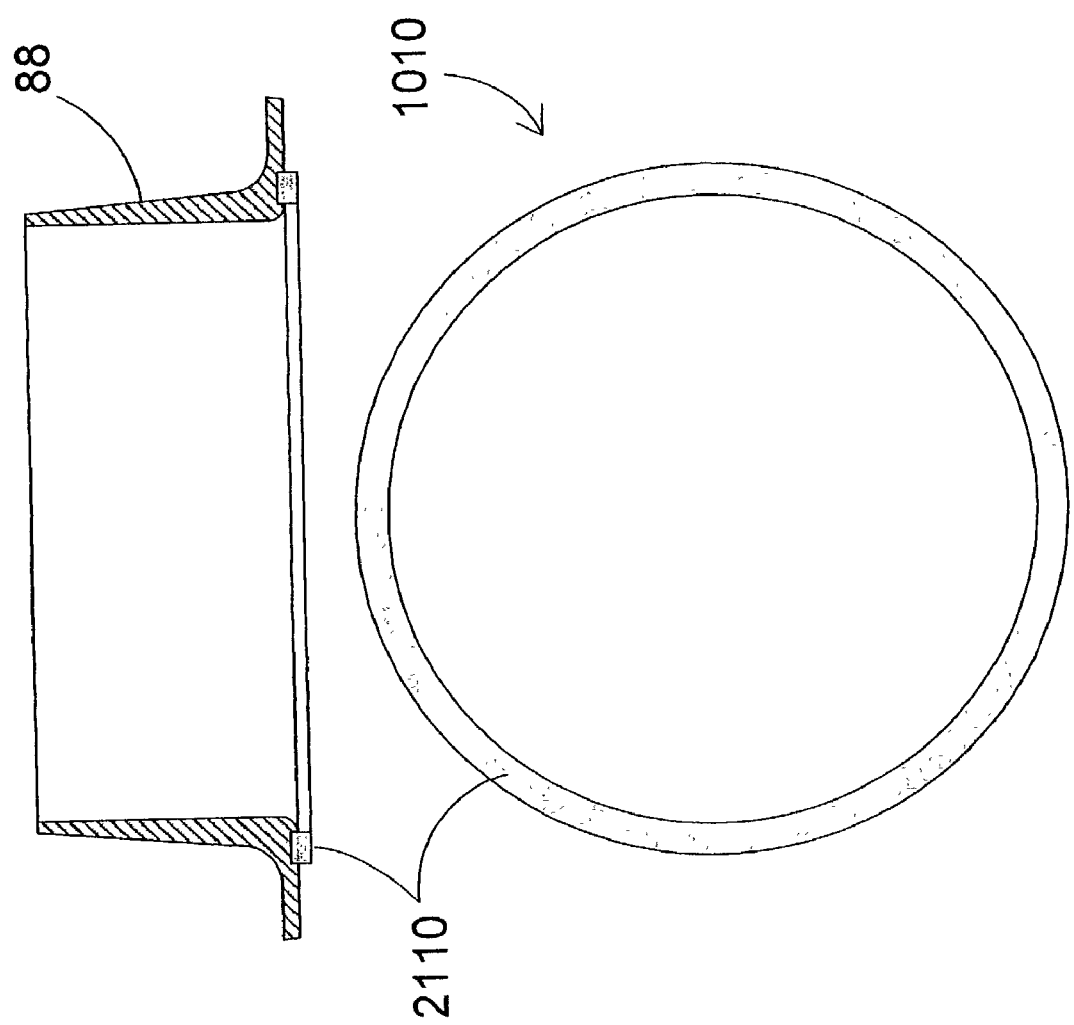

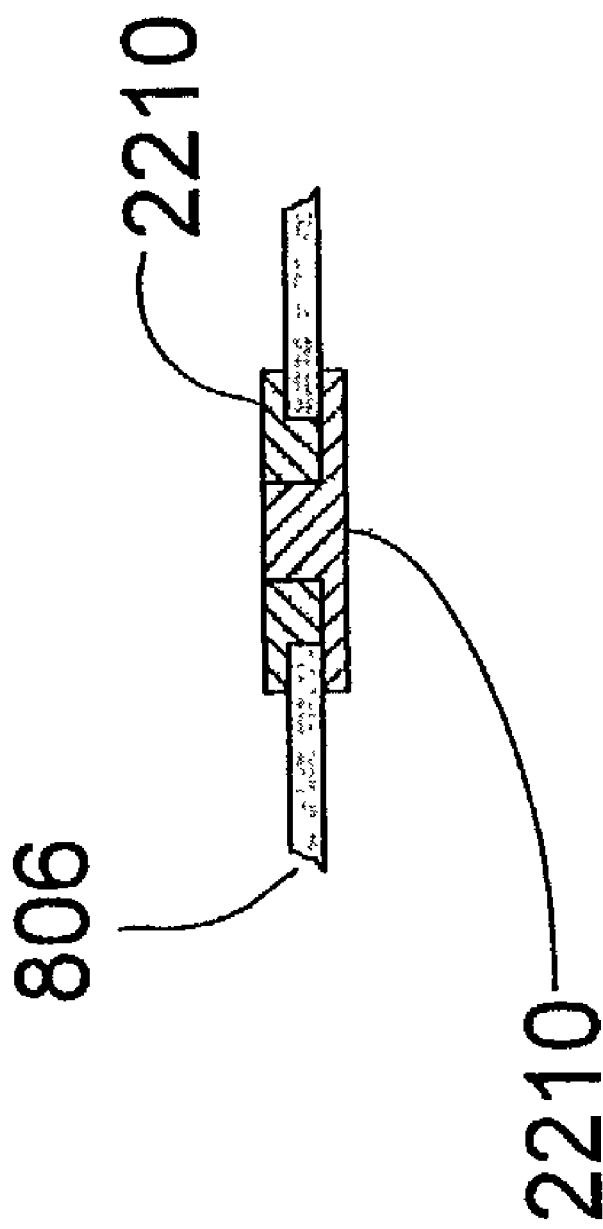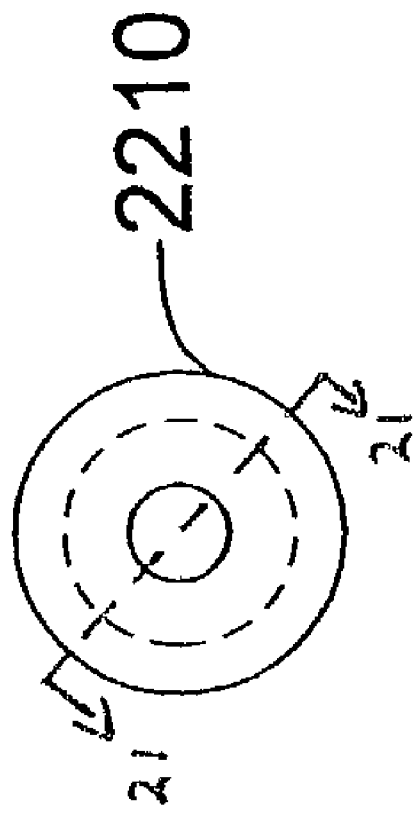

ENERGY SAVING VACUUM SYSTEM FOR PARTICLE, MIST, AND FUME COLLECTION

BACKGROUND OF THE INVENTION

1. Field of the Invention

This invention relates to gate valves used in machine shops that serve to control the flow of suction in collecting sawdust, mill filings and the like as well as mist and fume collection and more particularly to an advanced electric gate valve and accompanying system allowing the efficient operation of vacuum collection of dust and filings resulting in significant energy savings and noise reduction.

2. Description of the Related Art

The entirety of U.S. Pat. No. 6,012,199 issued Jan. 11, 2000 is incorporated herein by this reference thereto.

In machine shops, woodworking shops, and the like, work pieces are milled, lathed, drilled, formed, etc. to achieve the ends of the craft. In altering the structure of the work piece, dust, filings and/or tailings are created. For example, when sawing a piece of wood, sawdust will collect adjacent the area of the saw blade. Likewise, for lathing or milling processes, shavings or tailings from the metal work piece about or below the cutting blade.

Additionally, fumes or mist may be generated during industrial production, such as the lead fumes generated during the production of different types of batteries. Such fumes can be harmful to exposed workers and toxic to the environment.

The sawdust and/or metal shavings that collect in the workshop can become dangerous. The dust or micro fine metal particles may become airborne and inhaled deeply into the lungs of persons in the general vicinity, possibly causing injury and/or disease. Additionally, thick suspensions of dust become fire or explosion hazards as an explosion or fire may occur if the dust comes into contact with a spark or flame. Consequently, it is of great interest both to the proprietor and to the persons working in the shop to minimize the hazards arising from collection and suspension of dust and the like, including fumes and mist. Likewise, governmental regulations (OSHA or otherwise) may impose similar safety requirements.

Prior attempts to eliminate sawdust, metal shavings, and the like from the machine shop work area have used a centralized vacuum system where a central vacuum motor pulls a vacuum through a series of ducts. The end of the ducts are open adjacent the machine areas where dust or wood collect. The dust then travels through the ductwork to a collection or storage bin that is emptied on a periodic basis. Currently, in furtherance of the art, gates controlling the flow of air through the ductwork may be used so that a vacuum or suction is only pulled in areas where actual work is being done which reduces the necessary power needed to drive the dust-collecting vacuum system. This eliminates the energy waste associated with the vacuuming of otherwise clean and dust free areas. It also reduces the load the vacuum has to pull.

Currently, blast gates are known in the art and are generally controlled pneumatically. These gates are generally expensive and use a number of moving parts. Additionally, such blast gates and their hydraulic lines may be difficult to install, often requiring a professional. Such expense and difficulty may prevent their installation in smaller workshop areas where the initial cost may outstrip the monies available to pay for such a safety system.

Automatic control of such blast gates is preferred to manual operation as it is most the most efficient and convenient. While the preferred placement of blast gates is as close to the dust-creating machinery as possible, automatic blast gates also enable the spacing of the blast gates away from a flexible end of the duct so that it may have as much freedom as possible to operate, flexing under manual control to collect available dust, etc. or to be easily fixed in an advantageous dust-collecting position relative to a machine. Additionally, with manual gates, the operator must manually operate each of the gates for each of the machines. Gates that are left open when the associated machine is not being used are noisy and waste energy. Without the use of blast gates, the central dust collector must be much larger as the effective vacuum it must pull must match that necessary for every machine and every open duct all the time.

Alternatively, fumes and mist may arise from industrial processes such as occurs during the production of batteries (which may produce lead fumes). Such fumes and mist require collection to reduce toxicity and protect workers. Collection techniques for dust and particles can be applied to fume and mist collection.

Consequently, it is to some advantage to provide an inexpensive vacuum system using a simple and effective blast gate that is self-cleaning and provides automatic response to the operation of a machine for which dust needs collection. Such an automatic response may include the collection and implementation of instantaneous air-volume needs. Such a system may use a simple, easy to manufacture, and easy to maintain blast gate that is signaled by a central processor. The central processor may receive signals from a sensor that detects whether or not a machine associated with the sensor is in operation and therefore whether or not dust should be collected at that location. The central processor may also adjust gate operation to provide minimal necessary levels of air velocity and volume. Such a system may provide both energy-efficient operation, as well as noise reduction, respectively reducing costs and providing a more comfortable sonic environment.

In the present invention, a minimum required level of air velocity and airflow is maintained due to operational requirements. The associated computer may adjust the blast gates so that a minimal percentage of gates are open or a sufficient open cross section is maintained to maintain minimum air volume passage through the ducting system. The vacuum to system may be designed by using calculations based on the probability of machine use as well as general system ducting described in more detail herein. For increased efficiency or otherwise, smaller duct work cross sections may be used in certain applications or subsystems of the present invention. The vacuum system set forth herein may not only be used in word working and machining facilities, but also in printing, food processing, chemical, mining, car manufacturing or other manufacturing, medical facilities, as well as other factories and plants.

The invention described in the foregoing description and accompanying claim remedies many of the drawbacks presently exhibited by machine shop dust collection systems and does so in an inexpensive and highly-effective manner.

SUMMARY OF THE INVENTION

The present invention provides cost effective and energy efficient means by which hazardous or dangerous dust, filings, particles, fumes, mists, etc. may be collected in the professional or individual machine shop.

In one embodiment, a blast gate provides effective valve means by which each one of several vacuum ducts may be individually controlled. The blast gate has a frame or chassis about a central panel, louver, or blade that pivots upon a central joint or hinge by means of a DC motor. Controlling the polarity of the electricity to the motor controls its direction. A slip clutch or the like allows the time of operation, and not a feedback switch, to determine whether or not the blade is fully opened or closed.

Alternatively, the blast gate blade may have a toothed outer edge that engages a motorized gear. Control of the gear provides control over the blade and the open/closed nature of the blast gate. Certain mechanical advantages are realized in the circumferential, rather than the central, activation of the blade.

Alternatively, another embodiment may be achieved by using an "electronic clutch," electronic circuit, which limits the maximal current to the motor. Electronic clutches do not limit the current for a few hundred milliseconds after the start of the motor. During this initial start, the motor current must be high to overcome mechanical losses and losses created by high vacuum level in the ducting. During the movement of the gate, current to the motor is limited to a certain preset value. When the motor reaches its mechanical limit (closed or opened gate), or any obstacle (hand, large wood chip, etc.) then the electronic circuit stops the motor's movement. Such devices as an electronic clutch act as a blade travel limiting system to protect the gate, blade, and any obstruction for the blade.

In another embodiment, mechanical or electronic limit switches (hall sensors and magnets are preferred) are used to stop the blast gate at mechanical limits (opened or closed gate). Also in the embodiment limit switches and circuits (i.e. a toroidal coil reading current of motor, or coil sensing magnetic field of the selected motor) may be used which limit the current to the motor to protect the gate, the motor, and hands of the worker.

A central microprocessor senses signals from a piezoelectric or other machine sensor (i.e., a toroidal coil). A piezoelectric sensor and/or its signals may be enhanced by adjacent magnets which also provide mass to increase the vibration of the piezoelectric element. Each machine in the shop is associated with a blast gate and a machine sensor. When the machine operates, the sensor sends an operating signal to the microprocessor which then opens the blast gate and controls the operation of the dust collector or vacuum system in order to ensure proper suction volume. Piezoelectric (vibration) sensors are typically used for self-installing systems (home shops, small commercial shops) because such sensors are very easy to install. However, for the industrial installation, a preferable type of sensor is a toroidal coil, which senses current to the motor of the machine and the generation of any type of dust, fume, or mist.

As an advantageous element of the blast gate of the present invention, a small air intake may be present allowing air flow from the chassis into the gap accommodating the blade. This prevents sawdust, shavings, and the like from settling into the gap between the two parts of the blast gate chassis. This consistently allows full closure of the blast gate by the blade, increasing its utility, lowering maintenance cost, and providing more reliable operation.

Additionally, a method and system for realizing energy savings in dust collection is provided by the present invention. A variable speed drive (inverter) may be incorporated into the drive fans' motors. Configuration of the system with blast gates, sensors, a control computer and variable speed drives could save up to 80% of the energy normally used by the current state-of-the-art vacuum systems, if appropriate ducting is used that takes into account a probability calculation of machine use. Such high energy savings is supported by the so-called fan law (affinity law).

OBJECTS OF THE INVENTION

It is an object of the present invention to provide a dust collection system for a machine shop or the like.

It is another object of the present invention to provide such a dust collection system in an inexpensive but highly effective manner.

It is another object of the present invention to provide such a dust collection system that is energy efficient and therefore more ecologically sound.

It is another object of the present invention to provide a dust collection system that provides cost savings and lower expenses by saving energy.

It is another object of the present invention to provide a mechanically simple yet sophisticatedly designed blast gate that provides effective vacuum regulation means in a low maintenance and reliable manner.

It is another object of the present invention to provide a centralized control system by which such blast gates may be regulated in an energy efficient means, said central control also controlling the operation of the dust collection vacuum system.

It is another object of the present invention to provide a gate valve that is self-cleaning and reliable.

It is yet another object of the present invention to provide a gate valve that is toothed about its exterior for engagement by a gear for high ratio leverage and reliable operation.

It is another object of the present invention to regulate fan speed to save a higher amount of energy while the system is maintaining minimal airflow.

It is another object of the present invention to provide better dust, particle, fume, and/or mist removal by calculating the ducting needed based on the probability of the use of particular machines and on blast gates being or presently installed at each workstation.

These and other objects and advantages of the present invention will be apparent from a review of the following specification and accompanying drawings.

BRIEF DESCRIPTION OF THE DRAWINGS

FIG. 19 is a plan view of a slip washer used in the blast gate of FIG. 8.

FIG. 20 is a top plan view of a manual engagement button for the blast gate blade.

FIG. 21 is a cross sectional view of the manual engagement button of FIG. 20 shown as embedded in the blast gate block.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The present invention resides in a dust collection system for machine shops and the like that require the collection of dust generated by machining and woodworking processes. As a saw or the like operates, the work piece upon which it acts may give rise to dust, shavings, filings, or the like during the machining or wood working process. In other processes, such as battery production, debris in the form of fumes and/or mists may be generated requiring collection. For purposes of description, all such debris is designated as "dust" herein. For safety and health concerns, a duct, or conduit, may provide a dust-collecting vacuum adjacent the area where the dust is generated. Additionally, many machine tools of the present day incorporate a dust collection system that simply requires the connection of a vacuum system duct in order to reduce significantly, if not entirely, the dust that becomes freely available in the adjacent environment during the machining process. Such dust may become a hazard in several professions including woodworking, metalworking, printing, as well as food-related industries, dentistry-related businesses, and chemical manufacturing.

Figure 1:
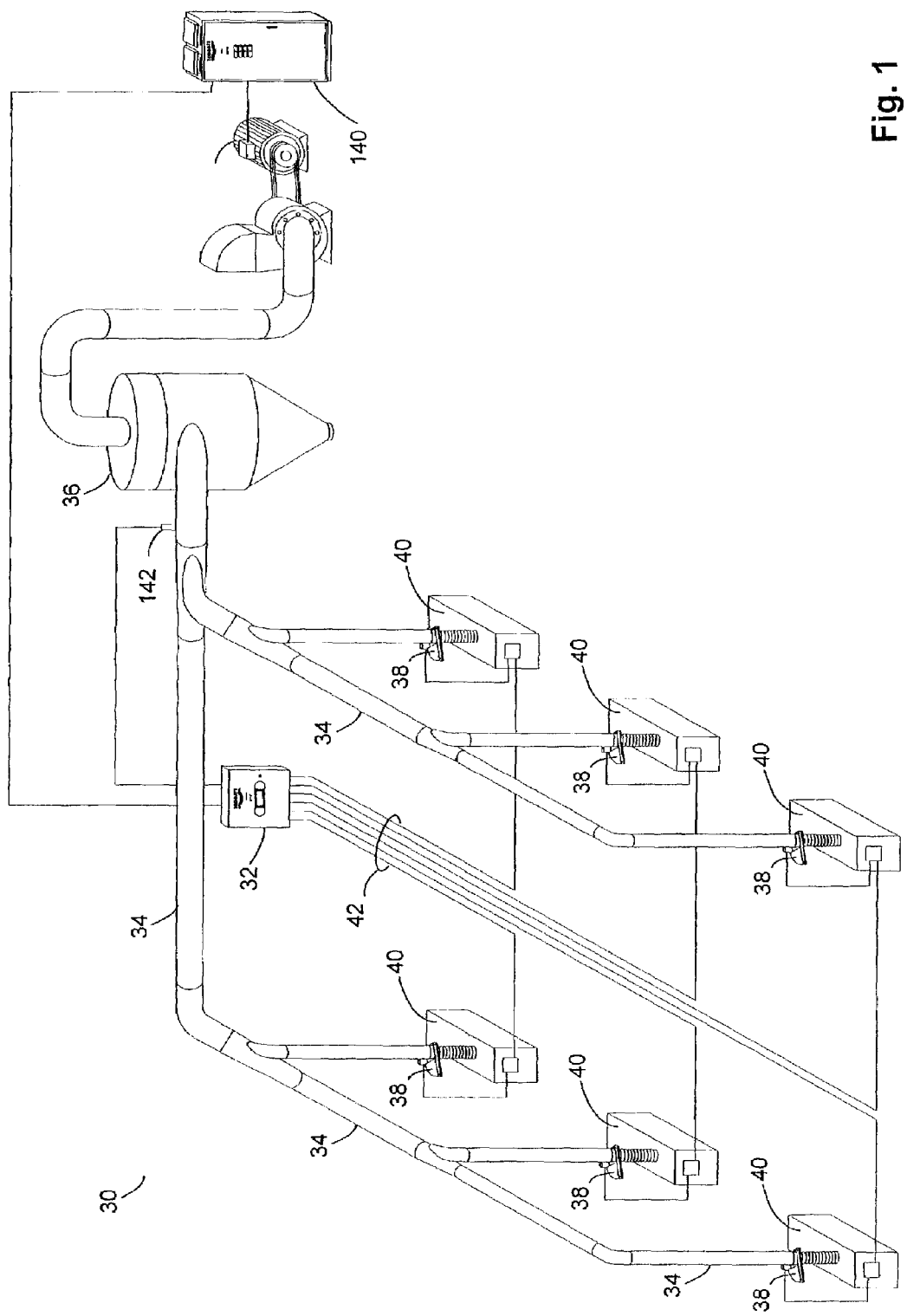
FIG. 1 shows a schematic diagram of the dust collection system of the present invention.

As shown in FIG. 1, the dust collection system 30 of the present invention has a central control box and microprocessor 32 which controls the operations of the entire system by means of a feedback mechanism accompanying the duct system 34. The central control 32 is additionally connected to the dust collector vacuum system 36. A series of valves or blast gates 38 (FIGS. 2, 3, 8, and 9) serve to open/close the transmission of the vacuum to the associated machinery 40. As can be seen from inspection of FIG. 1, such machinery may include saws of various sizes and types, rollers, lathes, grinders, cutters, band saws, etc. Additionally, a floor sweep may bring the vacuum adjacent the floor so that debris may be swept towards the nozzle and taken up into the dust collector vacuum 36.

Sensors indicating the operation of specific machinery 40 may be based on vibration and use piezoelectricity or may be based on tool activity and use some operating parameter. A piezoelectric device may be attached, as by VELCRO® hook and loop fastener or otherwise, to a machine for which a dust-collecting vacuum is desired when operating. When the machine is turned on, the vibration of the machinery causes the piezoelectric device to shake, or vibrate, slightly bending the piezoelectric crystal. The signals are transmitted to the central controller 32 where they indicate the operation of the machinery. In response to the sensor signals, the central controller 32 activates the dust collector vacuum 36 (if it is not already activated) and opens the corresponding blast gate 38. The vacuum is then transmitted to the appropriate machinery by means of the ductwork 34 and the blast gates 38. Controller 32 contains simplified model of both system (system curve) and fan curve. Part of the data for the model we enter to the computer during the setup of the system. For "system model" we are using the following data: CFM requirements of each drop, static pressure losses at each drop based on real measurements, minimum airflow in main duct, and minimum air flow in different parts of the system, based on real measurements. For "fan curve" we are using the following data: working range (based on manufacturer data), of RPM, working range for fan curve static pressure. Controller 32 is receiving during operation this information about the system running workstations—operating or non-operating, about the negative pressure in the main duct, and about request for additional operating modes (bypass, cleaning . . . ). This information enters to system model inside controller 32 and the following output is calculated: requested CFM requirements and requested static pressure calculated as a RPM of the fan (these data are sent by serial connection to power controller to adjust performance of the fan, number and location of open gates, i.e. usually there are more gates open than the number running workstations, because controller is using gates to maintain preprogrammed air/velocity and different location of the gates for balancing the system). Alternatively, a toroidal sensor 42 may detect the activation of any machine by circumscribing all power supply lines to all machines 40.

Alternatively, for machinery that does not vibrate or shake sufficiently to bend a piezoelectric crystal, a toroidal sensor may be used that detects the operation of the machinery due to its use of electric power. A toroidal sensor is generally placed in line with the power source for the machine in order to detect the machine's operation or may be placed around a number of power supply lines to detect the activation of any one of them (FIG. 1). Another type of sensor often used is a coil sensing magnetic field of running workstations motor. Additionally, any other appropriate sensors may be used in order to detect machine operation for feedback control of the blast gates and/or control center/computer of the present invention. Such other sensors may also include standard industry sensors such as those used for computer numerical control (CNC) machinery, including light beam and other sensors.

Special applications may require special sensors, and these may be incorporated into the present invention, provided that the feedback system is maintained such that vacuum is applied to areas where dust collection is needed.

Figure 2:
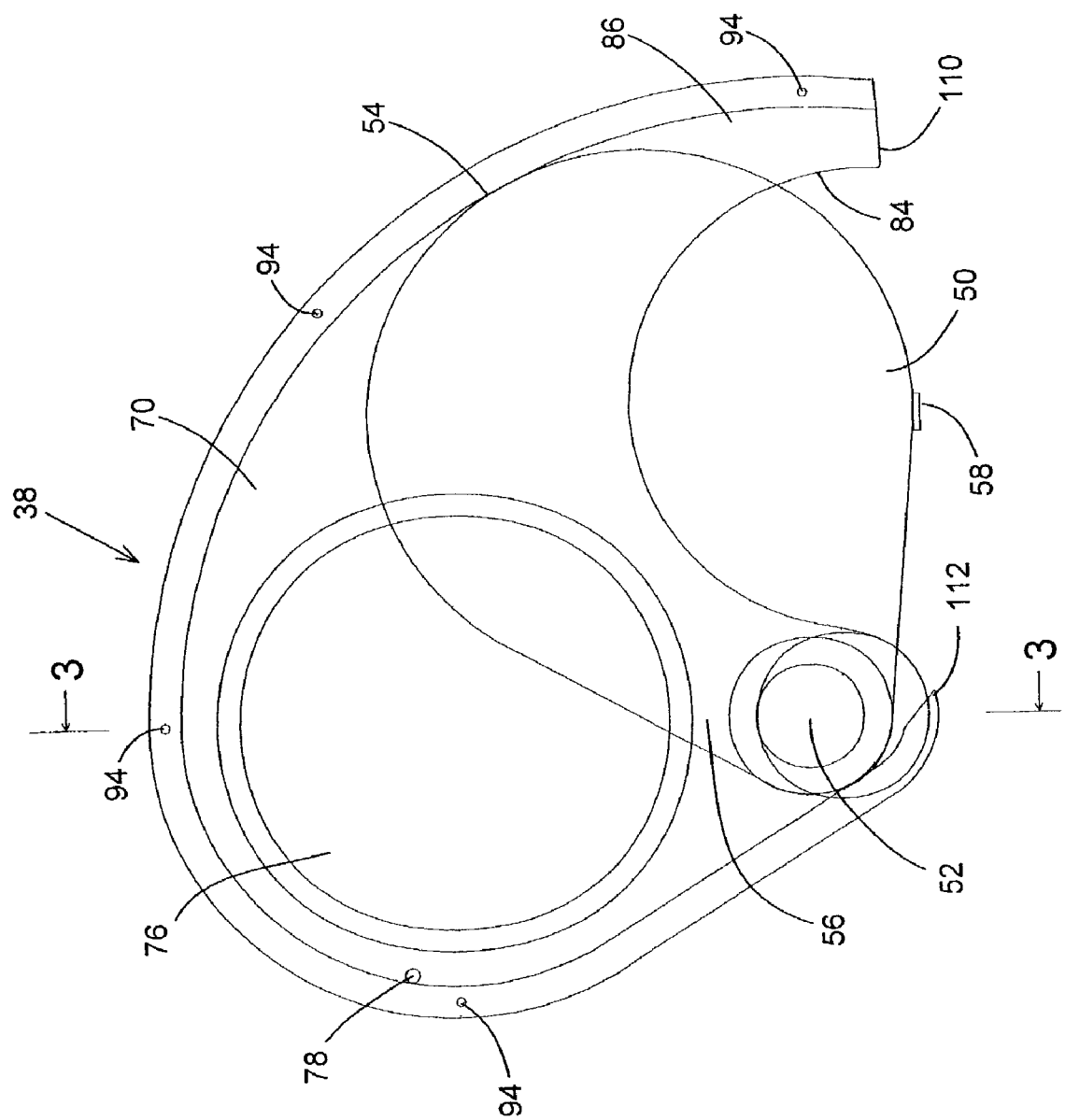
FIG. 2 is a front and partially cross sectional view of an electric blast gate valve of the present invention.
Figure 3:
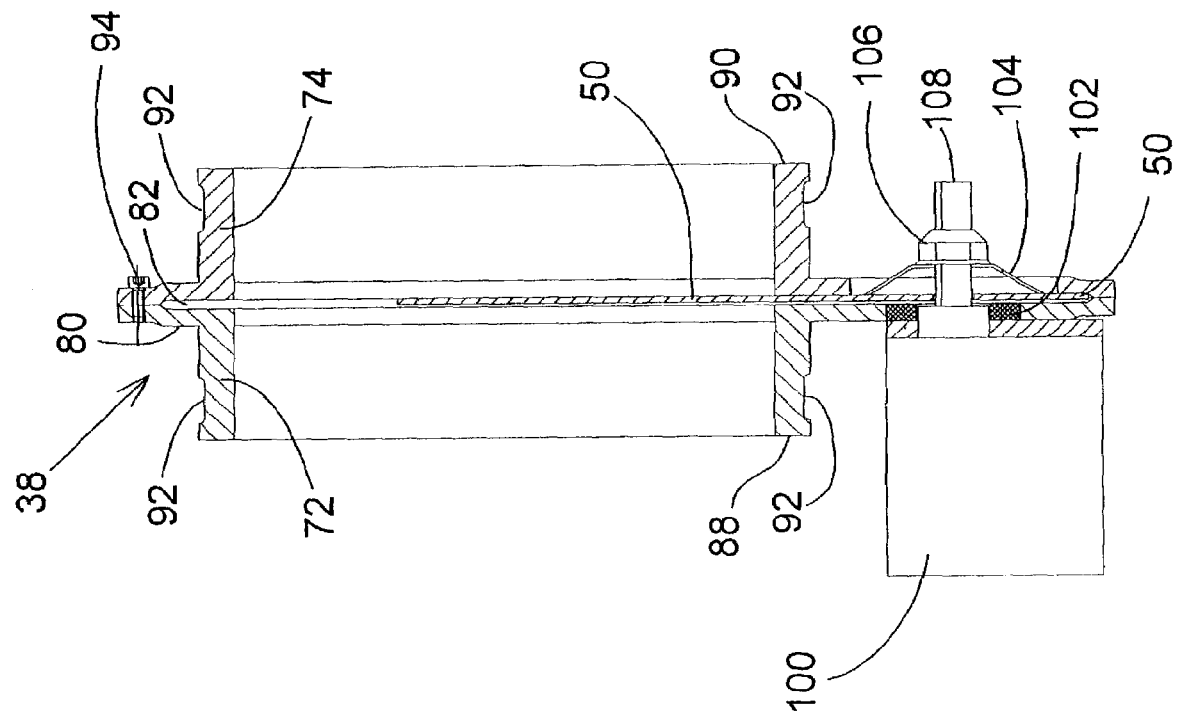
FIG. 3 is a side cross sectional view of the electric blast gate of FIG. 2 taken along line 3—3.

As shown in FIGS. 2 and 3, the blast gate 38 has an offset pivot 52 about which the rotating blade 50 rotates. The rotating blade 50 may be pear-shaped or teardrop shaped, having a wider lobed outer end 54 and a narrower and more pointed inner end 56. The inner end 56 is that end about which the rotating blade 50 pivots. Additionally, a stop 58 may be present on the edge of the free side of the rotating blade 50. The stop serves as a means by which rotation of the rotating blade 50 into the blast gate 38 may be stopped. Additionally, the opposite side of the rotating blade 50 may also act as means by which pivoting motion of the rotating blade 50 may be stopped as it engages the chassis 70 of the blast gate 38. The stop 58 may also take the form of a pull ring that allows the installing workman or blast gate manufacturer to gauge the tension on the slip clutch. Appropriate adjustment of the slip clutch may then occur should it be necessary.

The chassis 70 has two half shells 72, 74, as shown in FIG. 3. The chassis has a central aperture 76 that acts as the main channel through which the vacuum flow proceeds. This is the channel that is obstructed by the rotating blade 50 to control the flow of the vacuum through the blast gate 38. The vacuum flow channel 76 is completely obstructed by the rotating blade 50 when the rotating blade 50 is rotated into position.

Additionally, an air intake opening 78 is present adjacent the main vacuum flow channel 76. The air intake opening 78 is propitiously positioned between the two half shells 72, 74 of the chassis 70 to ensure that the dust and the like being pulled toward the dust collector 36 does not lodge between the two halves 72, 74 of the chassis 70.

As indicated in FIG. 3, the rotating blade 50 rotates within a gap 82 defined between the two half shells 72, 74 of the chassis 70. An outward projection 80 of the blast gate 38 serves as means by which the two half shells 72, 74 may be connected to each other about their perimeter. As is shown in FIG. 3, the outward projection 80 at its outer end projects slightly toward the other half shell. This aids in defining the gap 82 between the two half shells within which the rotating blade 50 articulates as it spaces apart the two half shells 72, 74. As shown in FIG. 3, the rotating blade 50 projects beyond the main vacuum flow channel 76 within the gap 82 in order to ensure minimal "blow by" past the rotating blade 50 by gas and debris that would otherwise be drawn towards the dust collector 36 when the blast gate 38 is closed.

As shown in FIG. 2, a portion of the chassis 70 is cut out to provide an open section 84 into which the rotating blade 50 moves as it pivots to open the vacuum flow channel 76. The open section 84 provides means by which the rotating blade 50 may be manually engaged should it be necessary to do so. The open section 84 generally extends in a semi-circular fashion into a flared section 86 of the chassis 70. Manual engagement of the rotating blade 50 is, in addition to the open section 84, facilitated by means of the stop 58 which may be grasped or pinched to pull open the blast gate 76 by the rotating blade 50 away from the flow channel 76.

In general, the blast gate 38 may be made of durable materials, preferably those with low friction so that a close fit may be enjoyed between the chassis 70 and the rotating blade 50. The rotating blade 50 is preferably made of material sufficiently stiff so that it does not flex within the gap 82. By not flexing, the rotating blade 50 is less likely to get caught or jam within the gap 82. Also, friction through contact between rotating blade 50 and the chassis half shells 72, 74 is diminished.

As shown in FIG. 2, the top 54 of the rotating blade 50 gently engages the inner portion of the outward projection 80. When the rotating blade 50 is rotated to completely close the flow channel 76, the innermost portion of the outward projection 80 should be in contact with as much of the perimeter of the rotating blade 50 as possible to ensure the greatest possible seal. As shown in FIG. 2, the air intake opening 78 may be approximately one-sixteenth inch (1/16) in diameter and positioned so that it is just above a midline of the rotating blade 50 when it is completely closed and obstructing the vacuum flow channel 76. Additional air intake openings may be added as needed and may serve to supplement cleaning functions.

In order to provide means by which the blast gate 38 may be attached to the ductwork 34, flanges 88, 90 circumscribe the vacuum channel 76. The flanges 88, 90 allow the blast gate 38 to be mounted into the duct system close to the operating machinery by means of pipe clamps or the like. As shown in FIG. 3, notches, or grooves, 92 serve as means by which such pipe clamps may better engage the flanges 88, 90. Ring clamps may also serve well for the same purposes. Gate assembly screws 94 serve to couple the two halves of the chassis 72, 74 to one another at the outward perimeter projection 80 of the chassis 70.

As can be seen, an advantageous blast gate 38 may be constructed that has a high degree of valving activity, enabling the secure opening and closure of the central vacuum channel 76 by means of a rotating blade 50 in a chassis 70. In order to enhance the utility of the blast gate 38 of the present invention, motorized means such as a DC motor 100 may be used to open and close the rotating blade 50. The DC motor 100 turns clockwise or counterclockwise depending upon the polarity of the DC current applied to the motor. One polarity of DC current will turn the DC motor 100 clockwise (opening the blast gate 38 as shown in FIG. 2), while the opposite polarity will cause the drive shaft of the DC motor 100 to turn counterclockwise (closing the blast gate 38).

The DC motor 100 is coupled to the rotating blade 50 by means of a slip clutch that allows the motor to turn although the blade 50 has stopped. Comprising the slip clutch are a keyed washer 102, a keyed spring washer 104, and a self-cutting nut 106. The rotating blade 50 and the chassis 70 define coaxial apertures through which the drive shaft 108 of the DC motor 100 passes to define the offset pivot 52 about which the rotating blade 50 rotates. As best shown in FIG. 3, the keyed washer 102 rests adjacent the motor 100 and the first chassis half shell 72. The rotating blade 50 is then present adjacent the keyed washer. The second chassis half shell 74 is then laid over the rotating blade to correspond with the first chassis half shell 72. The gate assembly screws 94 then fix the two half shells 72, 74 with respect to one another. The keyed spring washer 104 is then fitted over the drive shaft 108 with the self-cutting nut 106 cutting its threads upon the drive shaft 108 to secure the keyed spring washer into place.

The self-cutting nut 106 is threaded onto the drive shaft 108 so far as to secure the rotating blade 50 between the keyed washer 102 and the keyed spring washer 104 without over tightening. In this manner, there is some slippage between the drive shaft 108 and rotating blade 50 should the further rotating passage of the rotating blade 50 be obstructed as by the chassis 70 or otherwise. In order to obstruct the continued outward travel of the rotating blade 50 away from the vacuum channel 76, the gap 82 between the two half shells 72, 74 may be obstructed or filled in at the far end 110 (FIG. 2) of the chassis 70 or, preferably, by the arcuate spur end 112 of the chassis 70 adjacent the offset pivot 52 and the narrower pointed inner end 56 of the blade 50.

Once obstructed, the drive shaft 108 may continue to turn if the DC motor 100 is continuously powered. However, the frictional fit between the two keyed washers 102, 104 and/or that between the keyed spring washer 104 and the self-cutting nut 106 may serve as a slip clutch which allows the drive shaft to continue to turn without turning the rotating blade 50. This frictional fit between the keyed washers 102, 104 is determined by the pressure at which the self-cutting nut 106 is set into place. Such pressure needs to be weak enough to allow the drive shaft 108 to turn while the motor 100 is powered and the rotating blade 50 is held in place, yet strong enough to turn the rotating blade 50 through the gap 82 under a variety of vacuum pressures and conditions. As the keyed spring washer 104 is made up of a number of flexible leaves comprising the spring, the pressure upon the keyed spring washer 104 may be gauged generally to good effect with the craft becoming more evident with greater experience in adjusting the self-cutting nut 106.

As will be described in more detail below, when the DC motor 100 is powered, it is generally given a 10% more time period than is necessary for the entire opening or closing of the blast gate 38. This ensures that the blast gate changes its state completely (from either open to closed or closed to open) without undue burden upon the slip clutch. The DC motor may have 1:270 ratio gearbox integral to the DC motor 100. In embodiments achieved for the blast gate of the present invention, this gear ratio of 1:270 was preferable to others (such as 1:420) as it delivered sufficient mechanical advantage with good response time.

By means of the slip clutch, limit switches are not necessary. Design without limit switches can be preferably used on smaller sizes of gates (for 2", 3", 4" duct diameter). This reduces the overall signal burden and complexity as well as the component complexity of the present invention, better ensuring its proper operation and reliability. Additionally, this reduces service requirements. As for the other signal and electrical components of the present invention, DC power is delivered from the central controller 32 by means of a shielded wire. According to one embodiment of the present invention, it takes approximately two seconds for the blast gate to change from a closed state to an open state or vice versa. Mechanical limiters are present at the end positions for the blast gate 38 ensuring that its motion stops at the completely open and completely closed states of the blast gate 38.

Alternatively, an electronic clutch or a mechanical or electronic limit switch may serve to prevent the motor 100 from turning when the blast gate blade 50 is obstructed or the blast gate 38 is fully closed or fully opened. An electronic clutch (162 in FIG. 7) may limit the maximal current to the motor and may sense electronically or electrically the load that occurs on the motor when the blast gate blade 50 is obstructed or at a terminal end of its travel (open or closed). Electronic clutches do not limit the current for a few hundred milliseconds after the start of the motor due to the initial load as the motor current must be high to overcome the initial mechanical inertias and losses created by high vacuum levels and the duct work. During gate movement, motor current is limited to a certain preset value and when the motor reaches its mechanical limit (closed or open) or if any obstacle obstructs the travel of a blast gate blade 50, then electronic clutch circuit senses the load and stops the motor 100 in its further movement.

For limit switches, either mechanical or electronic limit switches may be used. Among such available forms of limit switches are hall sensors or magnetically-operated limit sensors. The limit switches are used to stop the blast gate 50 at its mechanical limits when the gate 50 is either opened or closed. Additionally, the same is similarly true when the blade 50 is obstructed. By detecting when the gate is obstructed, the gate 38, motor 100, and any obstruction (including the hands of a person) are protected from the over operation of the blast gate 38. Design with limit switches can be preferably used on larger sizes of the gates, where higher cost and higher complexity is not an issue.

Figure 4:
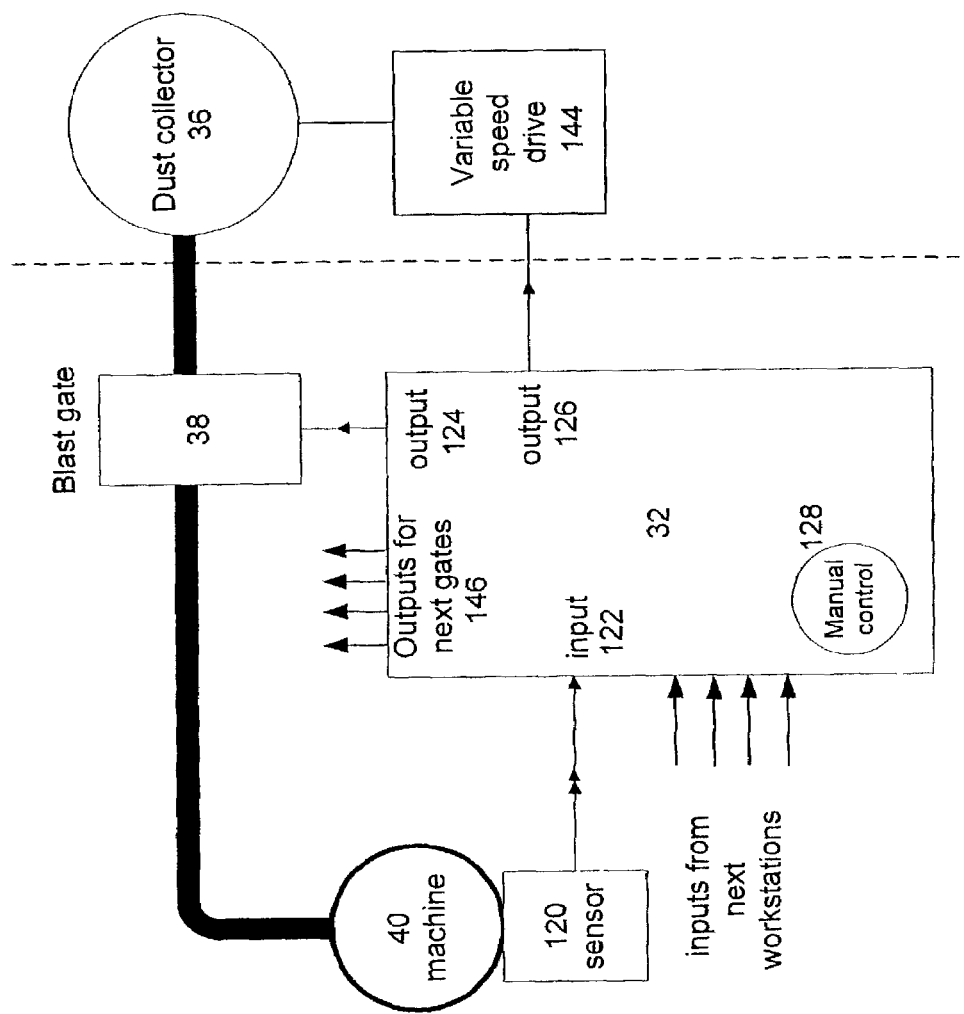
FIG. 4 is a schematic diagram of an embodiment of the signal paths present for operation of a single blast gate valve and associated machinery.
Figure 6:
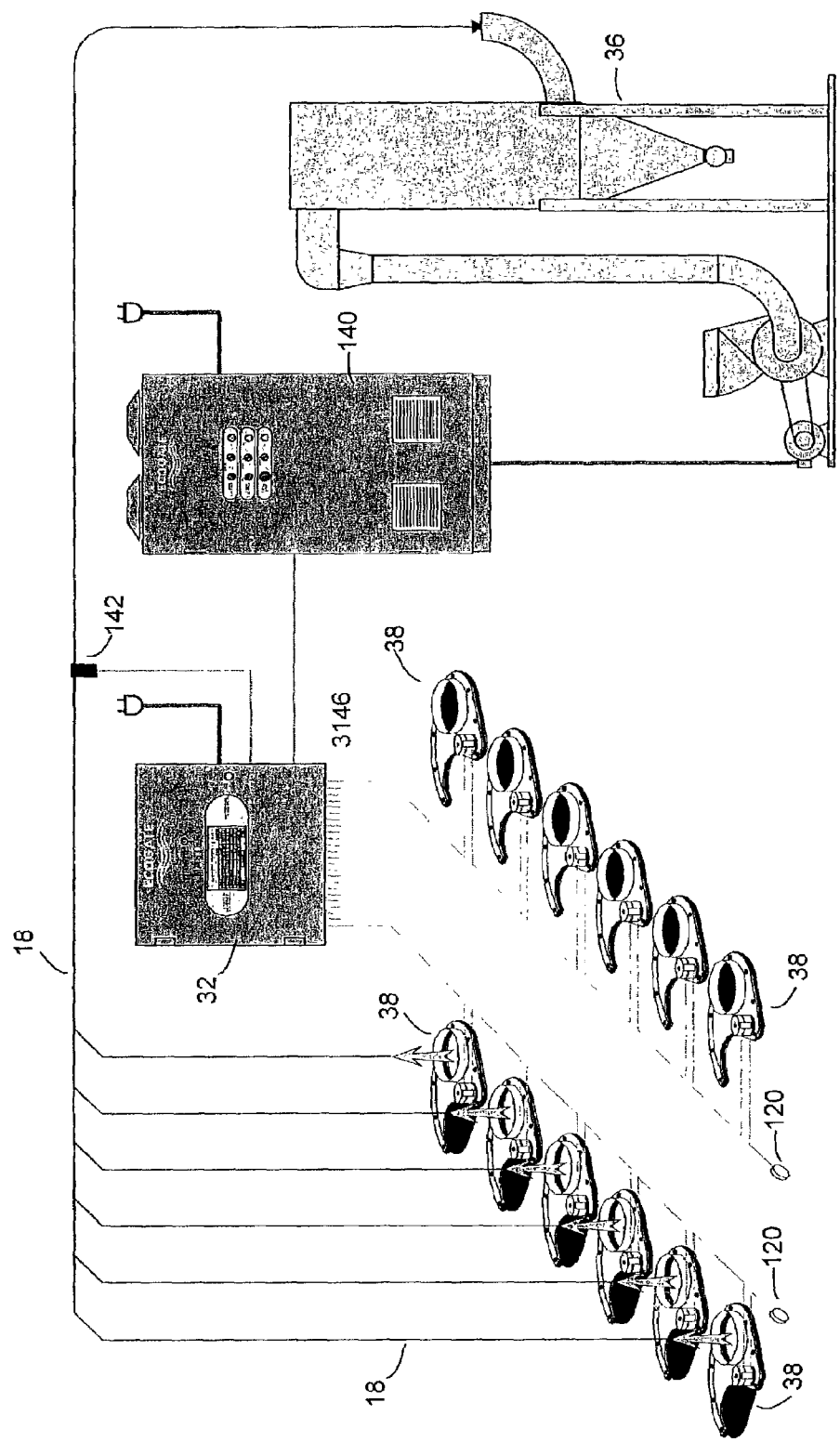
FIG. 6 is a view of control systems used in the present invention.
Figure 7:
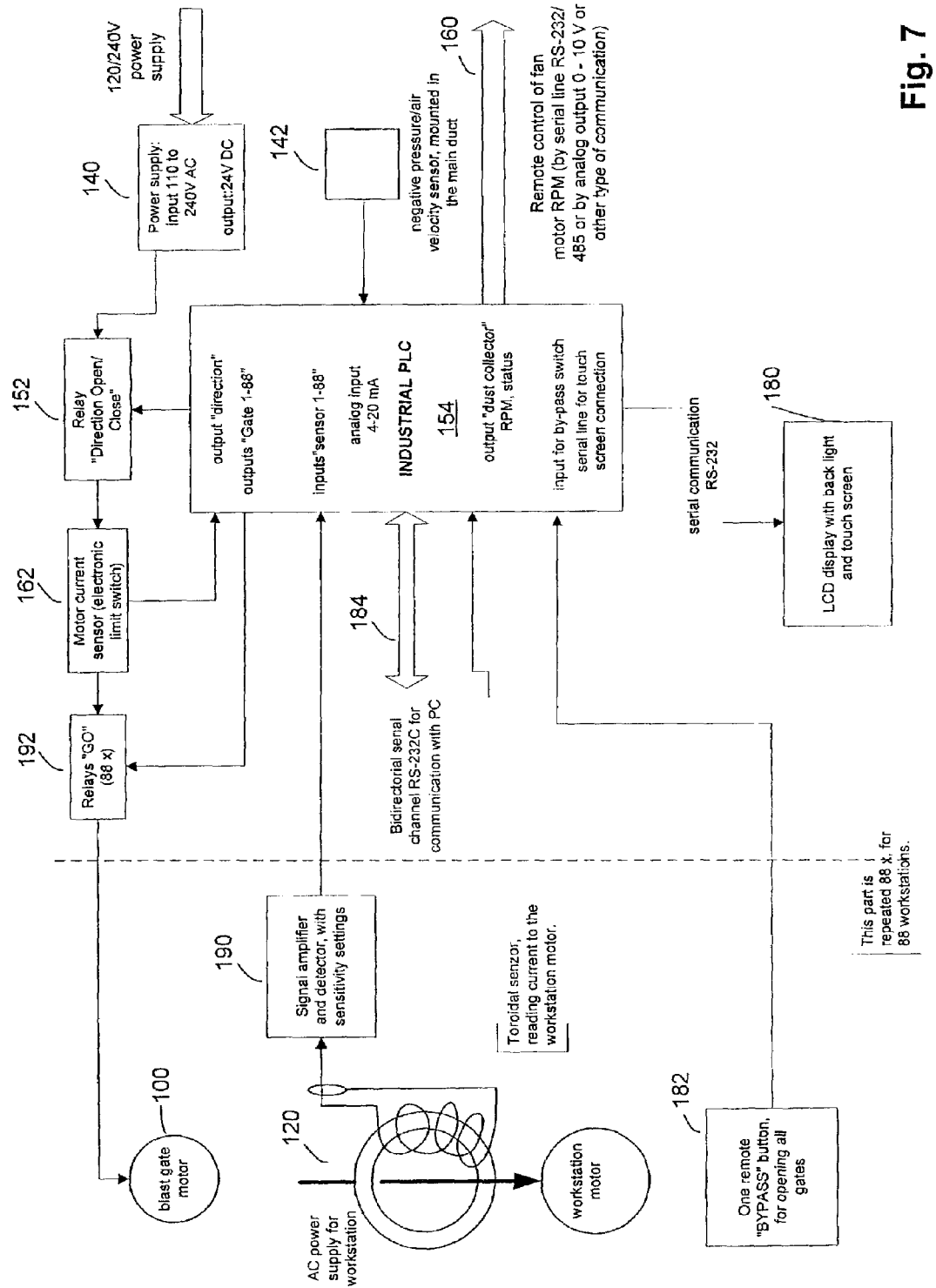
FIG. 7 is a schematic diagram of an alternative embodiment control systems for use in the present invention.

As shown in FIG. 4, the central controller 32 generally comprises a programmed or programmable microprocessor. FIG. 4 shows the configuration for one machine 40, but the configuration shown in FIG. 4 may be extended to an almost arbitrary number of individual machines 40, such as up to 88 machines (FIGS. 6 and 7). In order to signal the central controller 32 that the machine 40 is operating, a piezoelectric or other sensor 120 is attached to the machine 40 by means of a fastener, including hook and loop fastener (VELCRO®) or the like. Other means of attachment, such as permanent attachment, may also be used to good advantage. As mentioned above, a shielded cable couples the piezoelectric sensor 120 to the central controller 32.

Preferably, the piezoelectric sensor 120 is sandwiched between two disc magnets. By sandwiching the piezoelectric sensor 120 between magnets, the signals transmitted by the piezoelectric sensor 120 are magnified and stronger. The magnets serve as a mass, increasing sensitivity of piezoelectric sensor for low-frequency vibrations (around 60 Hz). Another benefit from using the magnets (as compared to other type of mass, for example metal) is the simple assembly to the metal piezoelectric disk (by magnetic force). Magnets also help to fix the sensor on the metal workstations by magnetic force. It therefore becomes an easier process to distinguish the signals transmitted by the piezoelectric sensor 120 from other signals, including random noise on the signal line. The piezoelectric sensor 120 and the sandwiching magnets may be housed inside a plastic box or chamber. Attachment as by VELCRO™ hook and loop fastener may be made between the machinery requiring dust removal and the plastic sensor-containing box.

Alternatively, a current sensor 42 may be used that detects current flowing to the machine 40. A toroidal coil may serve as such a sensor. The sensor 42 shown in FIG. 1 may detect any current on any machine to activate vacuum flow. Other configurations or placement of the current sensor 42 may also be used.

A level of negative pressure may be used by the central controller 32 to calculate the necessary fan RPM (revolutions per minute). Other information may also be used to calculate such RPMs. RPMs are regulated, or set, by a variable speed drive (VSD), or a variable frequency drive (VFD, "inverter"). Another function of the sensor 42 is duct safety. The integrity of the ducts should be protected in the case of over vacuum conditions. Where several gates malfunction and stay closed, a very high level of vacuum, or low pressure, in the duct system can shrink the ducting, possibly inflicting injury on such ducting. By monitoring the level of negative pressure in the ductwork, such injury to the ductwork can be avoided. The central controller 32 can monitor the level of negative pressure both for fan operation and preservation of the ductwork integrity.

To enhance the operation of the present invention, the central controller 32 may be pre-programmed with instructions that allow the central controller 32 to better distinguish what signals are transmitted by the piezoelectric or other sensor 120 from other, possibly noise-derived, signals. Such pre-programming may be achieved through erasable-programmable read only memory (EPROM) or other sophisticated firmware appropriately programmed to retain such signal-distinguishing instructions.

When the machinery 40 begins to operate, it vibrates and causes the crystal in the piezoelectric or other sensor 120 to slightly bend as it vibrates, transmitting electric signals along the shielded cable to an input 122 of the central controller 32. Upon sensing new signals (indicating machine operation) upon the input 122, the central controller 32 initially opens the to blast gate 38 by transmitting a signal to the blast gate 38 via a blast gate output 124. The output signal transmitted by the blast gate output may include a selectably polarized signal that causes the DC motor 100 of the blast gate 38 to open. As mentioned above, the motor signal is of specific DC polarity and lasts for approximately two seconds, approximately 110% of the time necessary to open the blast gate. The extra 10% is to ensure that the blast gate 38 completely opens even though there may be forced slippage of the slip clutch in opening the rotating blade 50.

Approximately two seconds after the blast gate 38 has been signaled to open by the central controller 32, the dust collector vacuum system 36 is signaled via a dust collector output 126 of the central controller 32. If the dust collector output is off, it is turned on after the blast gate 38 has opened. If the dust collector 36 is currently on, its power may be stepped up by a variable speed drive 144 to accommodate the additional vacuum load after the selected blast gate 38 has been opened. The vacuum pulled by the dust collector 36 is then transmitted to the ductwork 18 and passes through the open blast gate 38 onto the machinery 40.

All the time that the machinery 40 is operating, it continues to vibrate causing the piezoelectric sensor 120 to signal the piezoelectric sensor input 122 of the central controller 32. This maintains the open state of the blast gate 38 and the relevant power level of the dust collector 36. When the machinery 40 is turned off, it stops vibrating and the associated piezoelectric sensor likewise ceases vibrating. The piezoelectric sensor input 122 of the central controller 32 falls quiet, causing the central controller to first step down or turn off (as appropriate) the dust collector 36 followed by the closure of the blast gate 38. The cycle may then be reinitiated upon the next use of the machinery 40. Alternatively, a manual switch 128 may be used to manually override the piezoelectric 120 and its signal to piezoelectric sensor input 122.

When other sensors are used, such as current sensors, a similar process occurs where the sensor signals machine operation to the controller 32. The central controller 32, may have a descriptive exterior with identifying indicia that allows the person inspecting it to determine the state of the vacuum system of the present invention 30 as a whole. Indicators, such as LED or LCD indicators 180 (FIG. 7), may indicate the operating state of the blast gates and the direction through the ductwork 18 the vacuum flow delivered by the dust collector 36 is delivering. Additionally, an activation switch 182 may be present that allows the central controller 32 to be controlled as to whether it operates automatically or if manual operation is allowed. A series of signal lines 146 may provide communication between the central controller 32 and the blast gates 38 and the piezoelectric or other sensors 120. As an additional feature, the central controller 32 may have a remote button 182 (FIG. 7) allowing for remote operation of a blast gate such as one for floor sweeping and the like. Additionally, an exterior socket supplying 120/240 volt power may be present that allows the central controller 32 to determine whether or not a tool connected to the exterior socket is turned on. If so, the central controller 32 may open one of the blast gates, for example gate number 6, and activate the dust collection for the plugged in tool. In order to sense the current, a toroidal current transformer may be used as a sensor.

Additionally, a signal line to the dust collector/vacuum cleaner 36 may be present, as may be present a line to a 120/240 volts power supply. As set forth above, most of the signal lines present in the present invention are made through shielded two-conductor cable. The shielding for such cable is grounded and helps to control static electricity in the present system. In one embodiment of the central controller 32, an Intel 8052 microprocessor may be used in the central controller 32.

Figure 5:
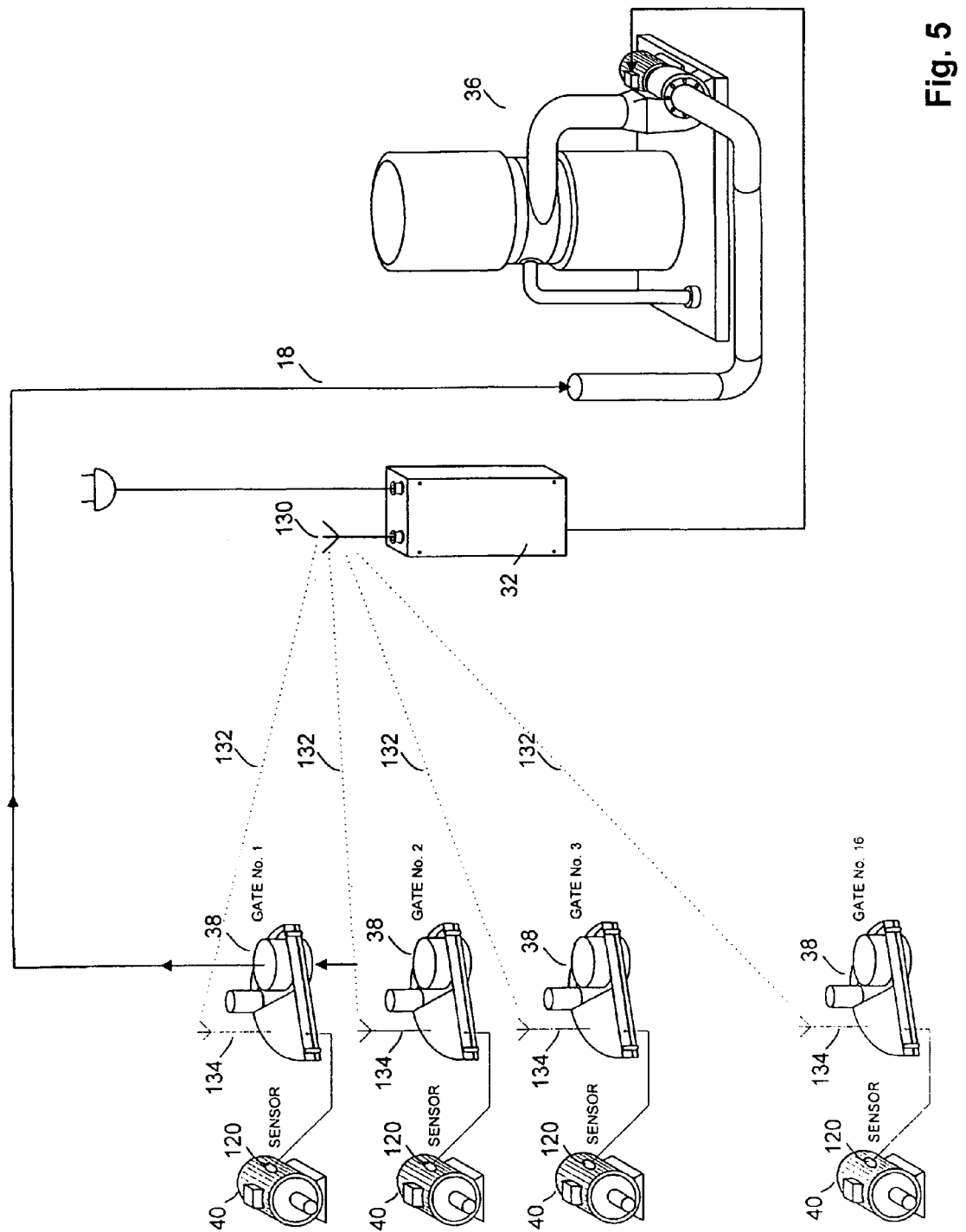
FIG. 5 is a schematic representation of an alternative and wireless embodiment of the present invention similar to that shown in FIG. 1.

As shown in FIG. 5, the control signals transmitted by the central controller 32 may be incorporated in a wireless system where an antenna 130 of the central controller 32 transmits wireless signals 132 to receiving antennas, or transceiving antennas 134, associated with each of the blast gates 38. The antenna 130 for the central controller 32 may also be a transceiving antenna such that information may be exchanged between each of the individual blast gates 38 and the central controller 32. Individual power supplies may be necessary for each of the individual blast gates 38 and certain identifying indicia may be required in the transmissions from the individual blast gates 38 to the central controller 32 in order to uniquely identify the blast gate 38.

In FIG. 6, the power supply unit 140 may be connected to a high voltage power supply (230/460 volts) and steps down the voltage and transforms it to 24 volts DC or as otherwise required by the blast gates 38 and/or central controller 32. The central controller 32 may be coupled to a negative pressure sensor 142 which is coupled to the duct work 18 in order to monitor the vacuum pressure, or lack thereof, generated by the dust collector vacuum system 36. The central controller 32 may also be coupled to a high voltage power supply in a manner similar to that present for the power supply unit 140.

The power supply unit 140 may also supply power to the dust collector 36 and act as the variable speed drive 144 for the dust collector system 36.

As shown schematically in FIG. 7, certain embodiments of the present invention may allow simple or complex configurations using 6, 24, or 88 blast gates to control the vacuum produced by the dust collector 36. In one sense, FIG. 7 is an expanded version of FIG. 4 showing several of the many components comprising the present invention. Along such lines, one embodiment may use a "signal/sum redirection" circuit as a low voltage relay connecting the output of the associated "go" relay when the state of the blast gate 38 is to be changed by activation of the DC motor 100. At all other times, the signal sum/redirection low voltage relay may connect the microprocessor or industrial PLC 154 to a sensor 120 so that the signal from the sensor 120 may be read by the microprocessor 154. In order to control the direction of the DC motor 100 on each of the blast gates 38, a direction relay 152 changes the polarity necessary for opening and closing the blast gate 38. The direction relay 152 is also controlled by the microprocessor 154.

When used, the "signal sum redirection" relay may selectably connect to either the signal amplifier and detector 190 or the go relay 192. When the state of the blast gate 38 is to be changed (off to on, on to off), the microprocessor 154 activates the redirection relay to establish a connection between the signal sum redirection relay and the go relay 192. The microprocessor 154 may then transmit the power pulse of the correct polarity to the DC motor 100 to open or close it. Upon completion, the redirection relay reverts to its connection with the signal amplifier 190 to await and detect signals from the sensor 120.

In one embodiment, the DC motor 100 and the piezoelectric sensor 120 are connected in parallel. Two diodes (not shown) may be in series with the DC motor 100 and isolate it from the sensor 120. The two diodes are connected in parallel with respect to each other and conduct in opposite directions. As the output of the sensor 120 is generally around 500 mV, sensor output does not overcome the bias of the diodes and the sensor output is not conducted by short circuit through the DC motor 100. Instead, the sensor output is conducted to the microprocessor 154 of the central controller 32 via the redirection relay and the signal amplifier and detector 190. The signals from the go relay 192 exceed 600 mV and are impressed upon the DC motor 100 to control the blast gate 38.

Additionally, DIP switches may be present by which the length of the pulses for the DC motors 100 may be set. An automatic/manual switch 128 (FIG. 4) may control the automatic or forced-on mode of the dust collector 36, respectively. When the central controller 32 is first turned on it performs a self-diagnostic test to confirm proper operation.

Upon turn on or power up, all of the connected gates 38 are sequentially closed. In one embodiment, if all tests are nominal, the LEDs of the central controller 32 may flash three times. If there is a problem, the lights may remain flashing. In one embodiment, a complete test of the central controller 32 can be performed by pressing any of the push buttons on the front panel when the power to the central controller 32 is connected. Under some circumstances, all of the connected blast gates 38 sequentially open and close until the power is switched off. Such opening and closing determined by the pressing of the associated manual engagement button on the front of the central controller 32.

A 24-volt DC power supply is provided by or through the central controller 32. This power supply runs the DC motors 100 present in the blast gates 38. Additionally, a 5-volt DC voltage source may be present for the microprocessor 154. The ±24-volt power sources are isolated because of the change of polarity required for the DC motors 100 of the blast gates 38 to open and close. Power supply to the central controller 32 may be 120-volt or 240-volt AC and may be switchable by switch or otherwise.

The schematic shown in FIG. 7 pertains to the control of 88 blast gates 38. Additional features comprising additional embodiments of the present invention may include the regulation of actual power to the dust collector 36 by an analog output voltage regulator 160 controlling an output signal ranging from 0–10 volts or by RS-232/485 or the like. A 0–10 volt analog signal or signal transmitted along the RS-232/485 serial communication line may be used to communicate with the variable speed driver to set the necessary fan RPM. A "virtual limit switch" 162 may be added which detects the current increase of the blast gates when a rotating blade begins working against the mechanical limit. The virtual limit switch 162 increases the system reliability as the increased current provides a signal that is read by the microprocessor of the central controller 32 and stops the power supply to the DC motor 100.

In some embodiments, a 1-kilohertz square wave signal may be generated by the microprocessor and amplified before being sent back to the sensor 120. The 1-kilohertz signal may cause the sensor 120, particularly a piezoelectric sensor, to act as an audio signal that the opening and closing of the blast gate 38 has been successful. It also indicates that the circuit to the sensor 120 is uninterrupted and continuous.

An LCD display with back lighting 180 may also be present as shown in FIG. 7. The LCD display provides display means by which the status, operating conditions, and operating choices may be conveyed to a viewer. Additionally, when coupled with buttons or switches on the front of the central controller 32, may provide by which such control may be more easily affected.

A serial port such as an RS-232C port 184 may be present by which the central controller 32 may be coupled to a personal or other type of computer for computerized monitoring and control of the central controller 32. Set up functions may be downloaded from the computer to the central controller 32 with record information or data uploaded to the computer through the port 184. A backup function may also be provided by which EEPROM memory may serve to save the status and condition of the microprocessor and related circuitry of the central controller 32. Additionally, such back up information may be sent to a computer attached to the serial port 184.

In FIG. 7, an industrial PLC 154 or the like can act as the central processor or program logic control for the operation of the vacuum system 30 as a whole. The industrial PLC may have an RS232 port for the transmission of RS232 serial signals 184 with an attached personal computer or other information machine. The industrial PLC 154 may have an LCD with a back lit and/or touch screen 180 in order to enable signaling or the like between a user or a human controller and the vacuum system 30. The industrial PLC may receive input from a negative pressure/air velocity sensor 132 that may be mounted in a main duct of the duct work 34 so that operation of the dust collector 36 may be monitored. The industrial PLC 154 may also transmit signals 160 to enable or provide remote control of the fan motor of the dust collector 36 in order to control the operation of the dust collector 36 via the fan motor RPM.

A power supply 140 may convert input power to 24-volt DC output for control by the industrial PLC 154. A 24-volt DC output is transmitted to a relay 152 which controls the direction (either open or closed) for the blast gate motor 100. The signal is transmitted by the relay 152 or received by the motor current sensor (electronic limit switch) 162 which transmits output not only to the industrial PLC 154 but also to an associated relay 192 which transmits the "go" activation signal to the blast gate motor. The blast gate motor 100 is activated by the industrial PLC 154 when the workstation motor is supplied with power. When AC power flows to the workstation, the toroidal sensor 120 will read the current flowing to the work station motor and signal the signal preamplifier 190 with its detector and adjustable sensitivity settings. The signal amplifier 120 then transmits a signal to the industrial PLC 154. The industrial PLC receives inputs according to the number of workstations present in the entire system 30 and transmits output according to the required vacuum or airflow demands. A remote or bypass button 182 may be coupled to the industrial PLC 154 in order to activate the system despite the operating status of any workstation motor or otherwise. As indicated in FIG. 7, the blast gate with its motor 100, the sensor 120 and signal amplifier 190 as well as a remote bypass button may all be repeated elements for each of the up to eighty-eight workstations (or more) possibly coupled to the dust collector vacuum system 36 via the industrial PLC 154.

Figure 8:
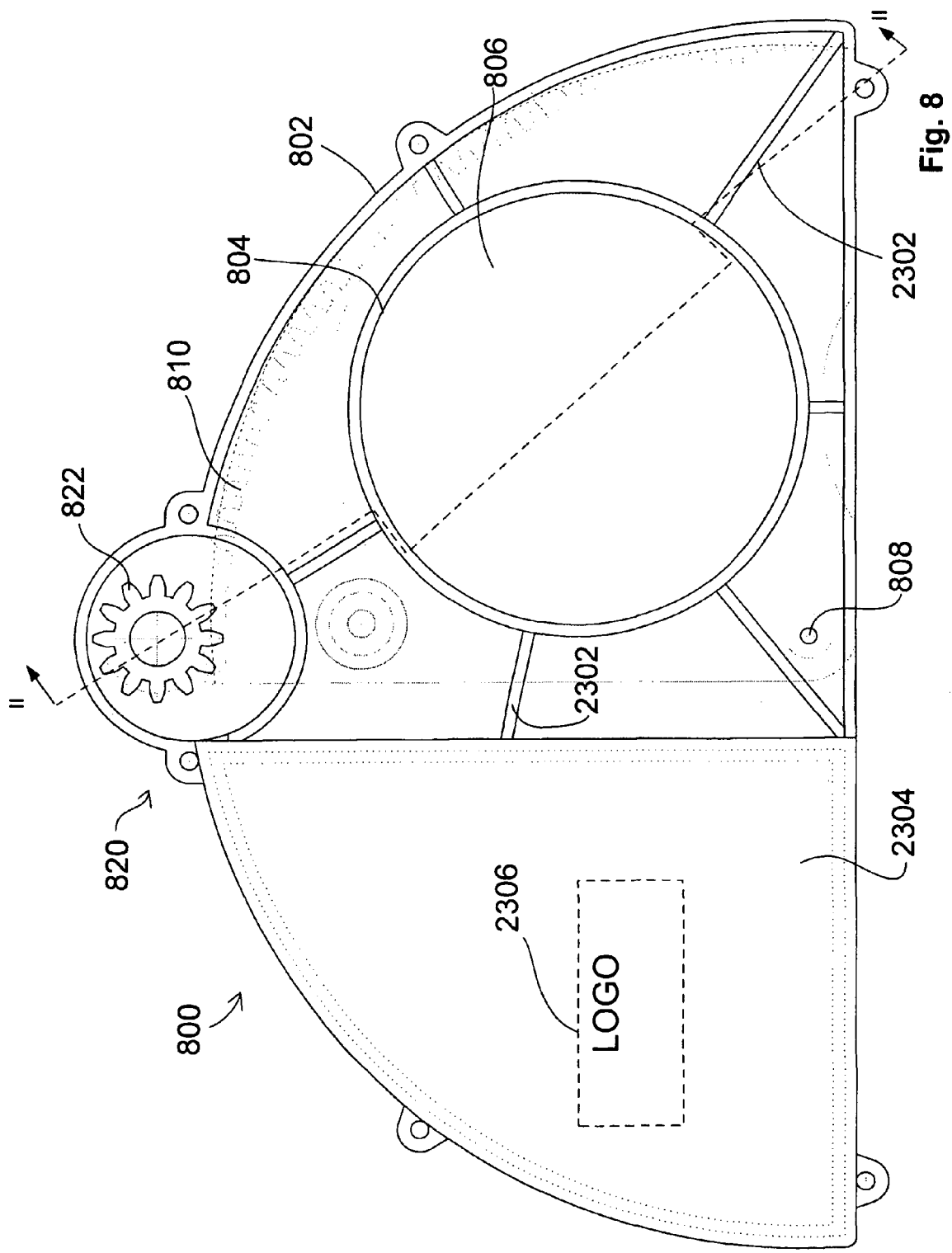
FIG. 8 is a top plan view of an alternative blast gate of the present invention.

As shown in FIGS. 8–21, an alternative embodiment of a blast gate used in the present invention may be achieved by which larger blast gates may be realized for greater volumes of gas and dust transport. In FIG. 8, the blast gate 800 has an outer shell 802 defining an aperture 804. The blast gate blade 806 (shown in phantom) pivots about a fixed axis point 808 to obstruct or close the blast gate aperture 804 or to allow gas/air and dust to pass the air through when the blast gate 800 is open.

Control of the blast gate plate 806 is achieved trough the blast gate motor assembly 820. In the embodiment shown, the motor assembly 820 is mounted in a spaced-apart relation from the fixed axis pivot point 808. The motor assembly 820 engages the outer perimeter 810 of the blade in order to control the angular disposition of the blade 806. The outer perimeter 810 of the blade 806 is notched, or tooted, so that it may enmesh the teeth of the driving gear 822 of the motor assembly 820. Rotation of the driving gear 822 with respect to the motor assembly 820 serves to move the blade 806 from the closed to the open position and vice versa. Springs 818 (or other biasing elements) may serve to biasedly engage and enmesh the motor assembly 820 with its driving gear 822 against the blast gate blade 806. This serves as a means by which, under some circumstances, the driving gear 822 may turn without causing motion in the blade 806, particularly when the blade 806 is obstructed or is at its extremes of motion (fully closed or fully open). The reverse is similarly true, such that manual engagement of the blast gate blade 806 may serve to move the blast gate 806 past the motor assembly 820 (and the driving gear 822) without injuring either the blast gate blade 806 or the motor assembly 820. The springs may allow any excess force to push the motor assembly 820 away from the blast gate blade 806, while allowing the motor assembly 820 to return to its engaged position with the teeth of the driving gear 822 engaging those of the perimeter 810 of the blade 806.

Figure 9:
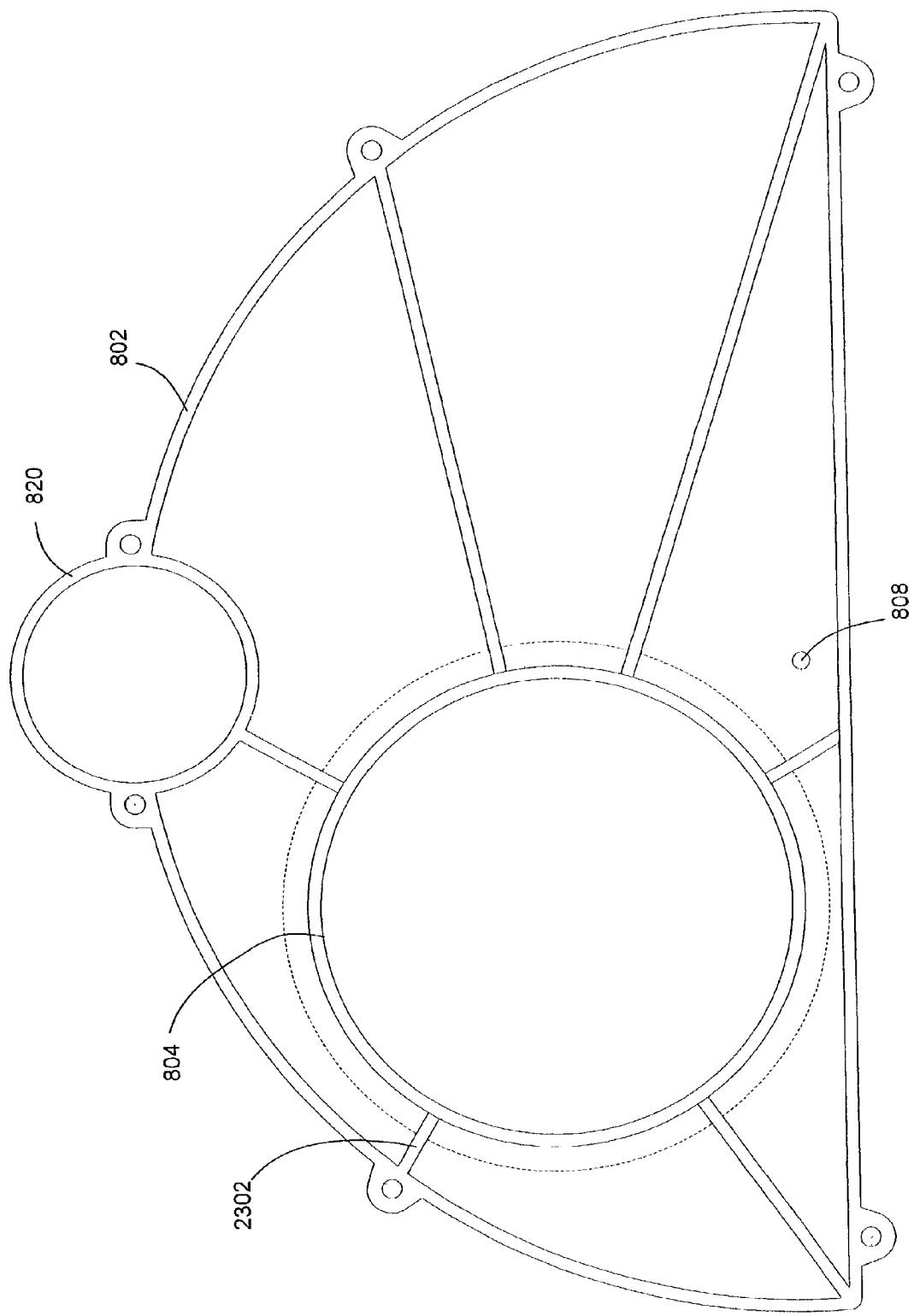
FIG. 9 is a bottom plan view of the blast gate of FIG. 8.

FIG. 9 shows the side of the blast gate 800 opposite that shown in FIG. 8.

Figure 10:
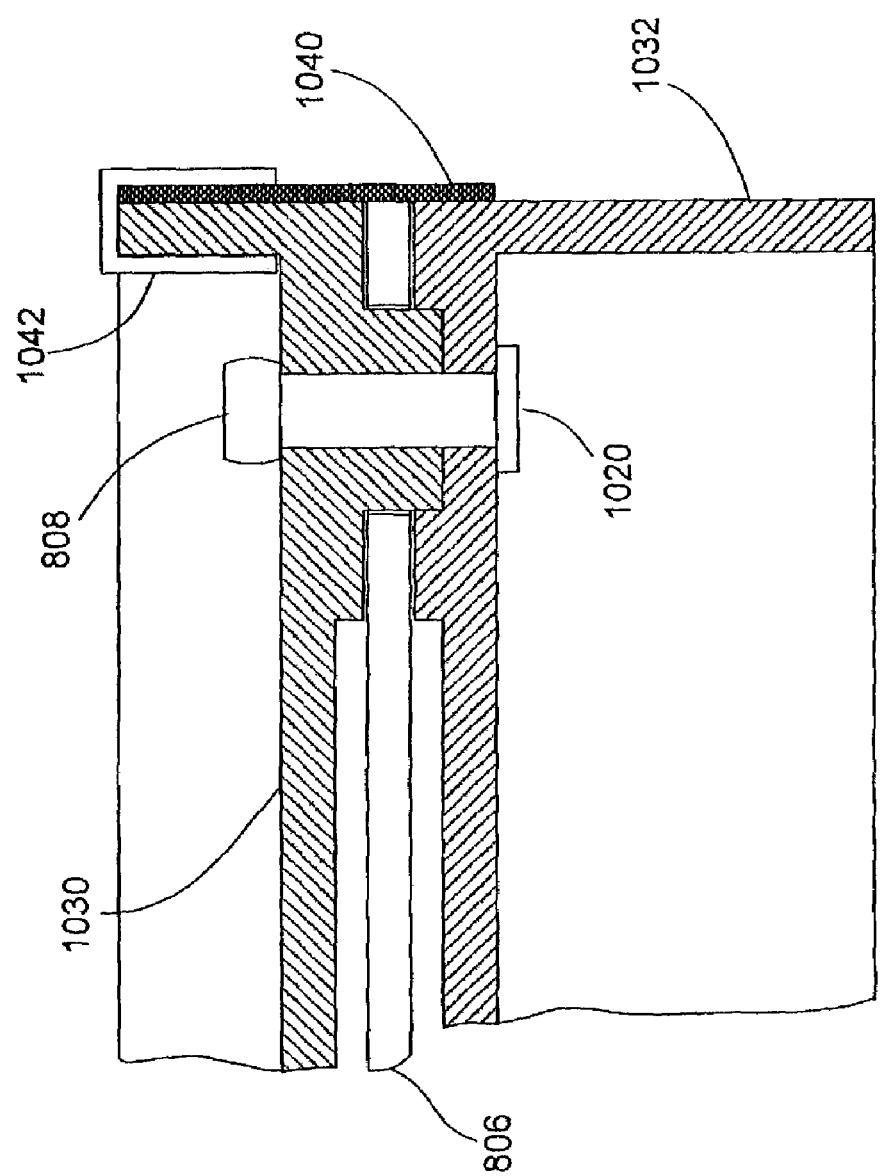
FIG. 10 is a cutaway detail of the rotating blade axle and sealing rubber gasket for the blast gate shown in FIGS. 8 and 9.

In order to enhance the free operation of the blast gate blade 806, low-friction slip washers 1010, (FIG. 19) such as those made of TEFLON, may be used to reduce the friction between engaging surfaces. FIG. 19 shows an embodiment of a low-friction slip washer that may be used in the present invention. As shown in FIG. 10, a nut and bolt assembly 1020 serves to allow the rotational engagement of the blade 806 (optionally, with the low-friction slip washers 1010) about the central fixed pivot point 808. Oppositely opposed flanges 1030, 1032 serve to provide projections by which the blast gate 800 may be affixed to a surface or the like. A sealing rubber gasket 1040 is used beneath the flanges 1030, 1032. The sealing rubber gasket 1040 has an automatic cleaning function to ensure that dust or other debris does not collect beneath the blast gate and/or the flanges 1030, 1032. A metal clip 1042 may serve to hold the sealing rubber gasket 1040 in place by engaging opposite sides of flange 1030 or otherwise.

The blast gate shell 802, as shown in FIGS. 8 and 9, may have a central aperture 804 of approximately four inches to twenty inches in diameter, an uncommonly large area through which dust may pass. If sufficient vacuum facilities are provided, there is generally no limit to the size of the aperture 804 in the blast gate shell 802. However, power and/or pressure limitations may serve to restrict the size of the shell aperture 804.

Figure 11:
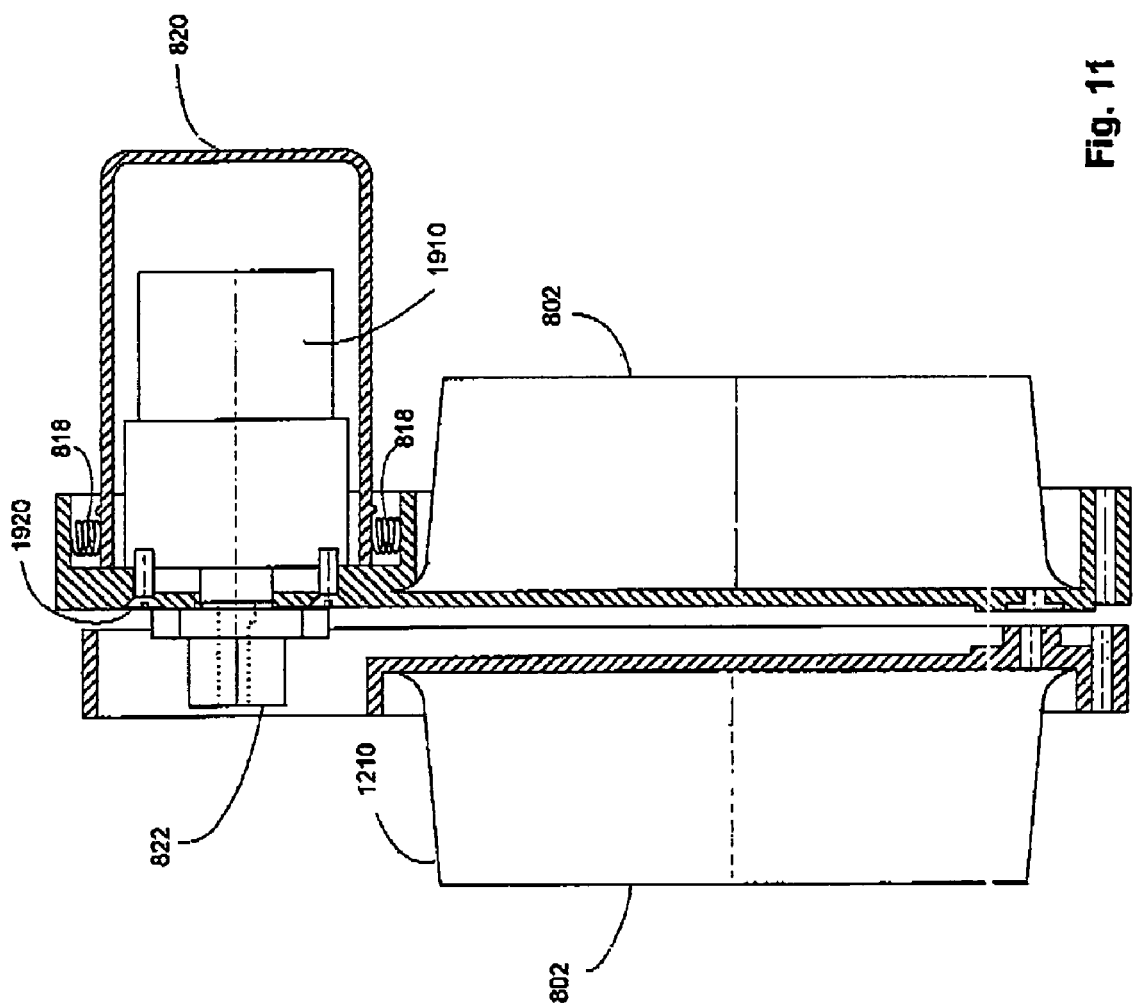
FIG. 11 is a side sectional view of the blast gate shell taken generally along line 12—12 of FIG. 8.
Figure 12:
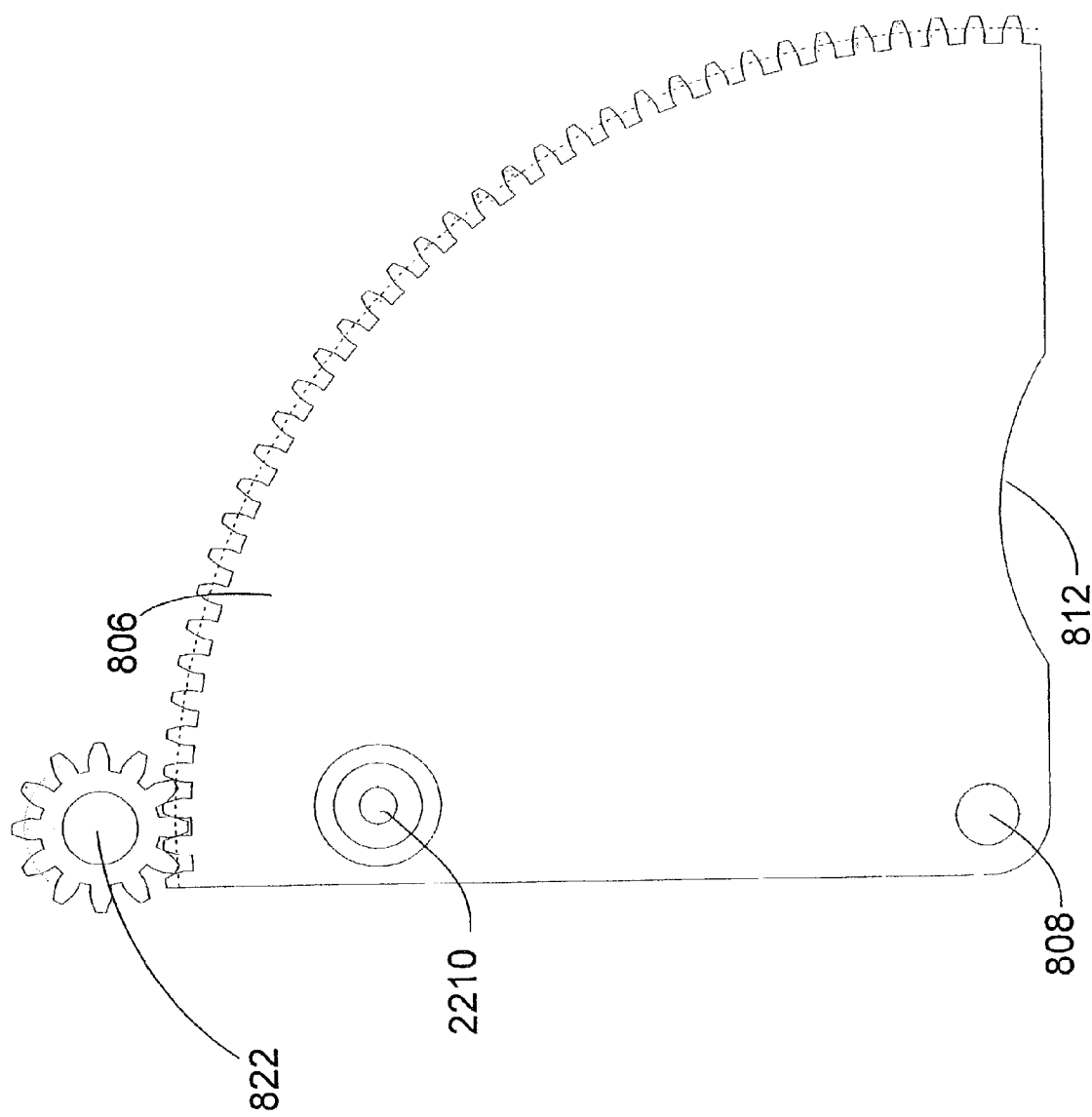
FIG. 12 is a plan view of the rotating blade used in the blast gates of FIGS. 8 and 9.

As shown in FIG. 11, the aperture 804 may be additionally defined by a circumscribing and projecting flange 1210, which may allow connection of the blast gate 800 to existing duct work or the like.

The rotating blast gate blade 806 may be made of ⅛-inch stainless steel and may be sandwiched between the low-friction slip washers 1010.

Figure 13:
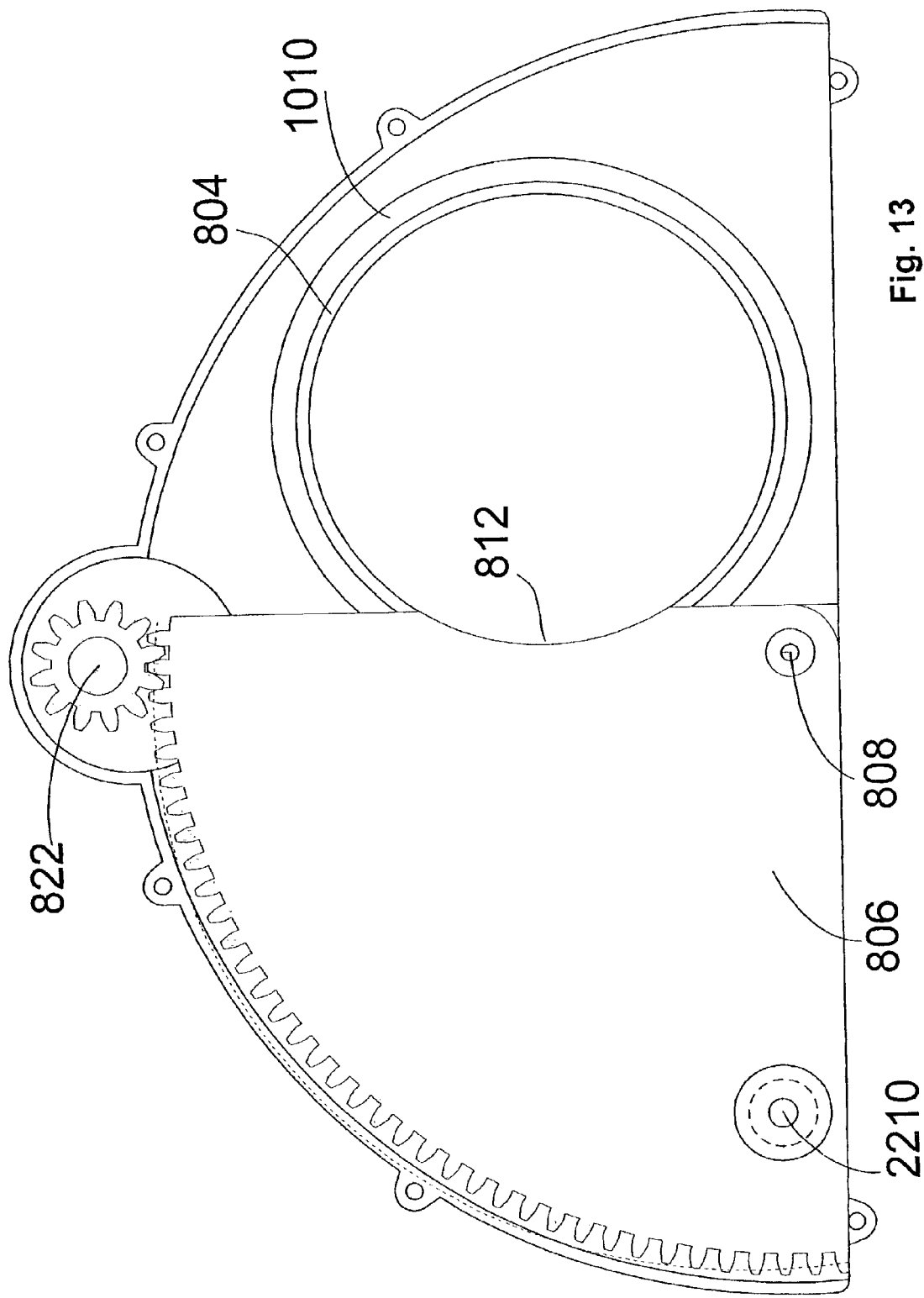
FIG. 13 is a partial plan view of the blast gate of FIG. 8 with the blast gate in an open position.
Figure 14:
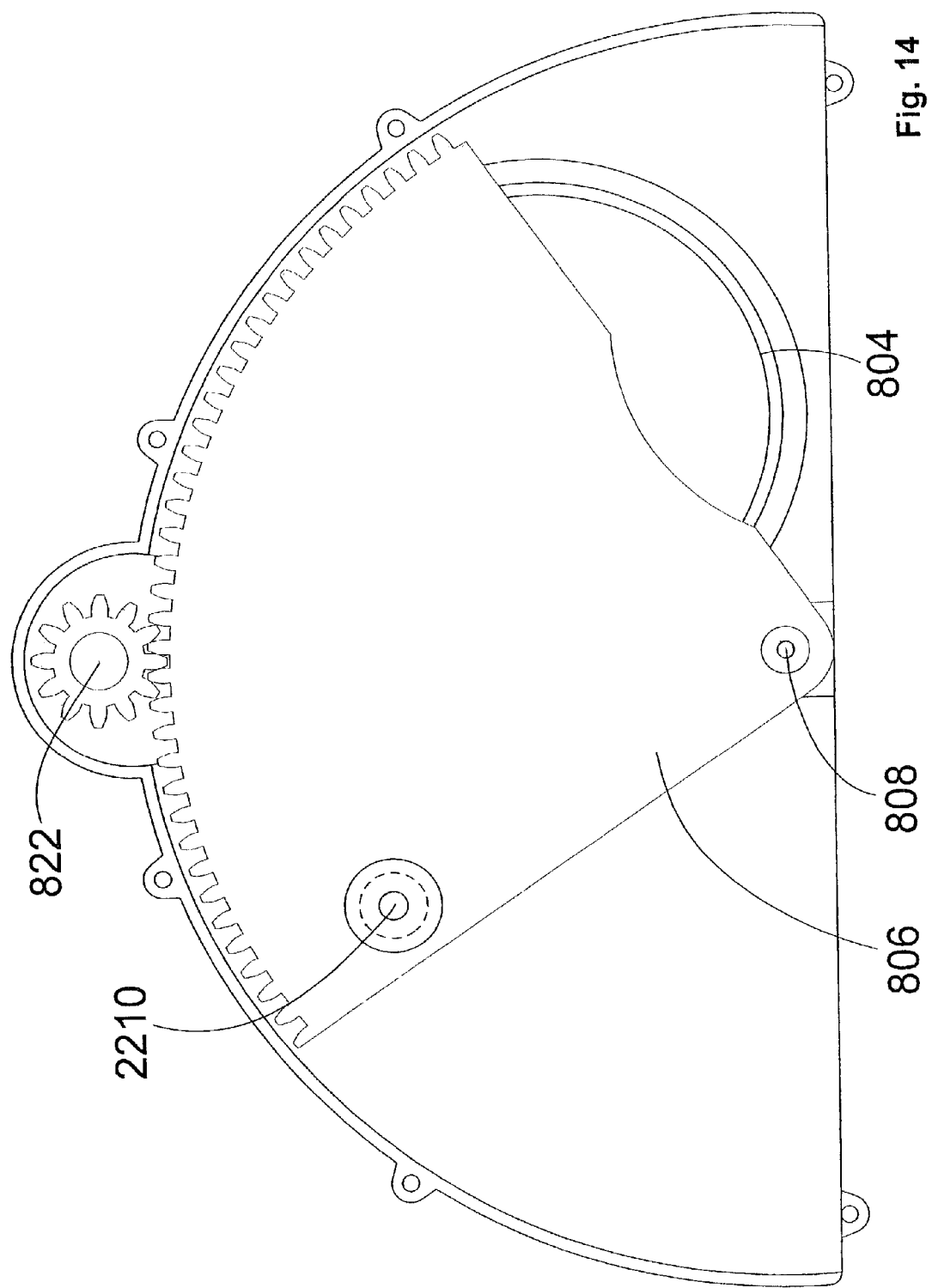
FIG. 14 is a partial plan view of the blast gate of FIG. 8 with the blast gate in a partially open/partially closed position.
Figure 15:
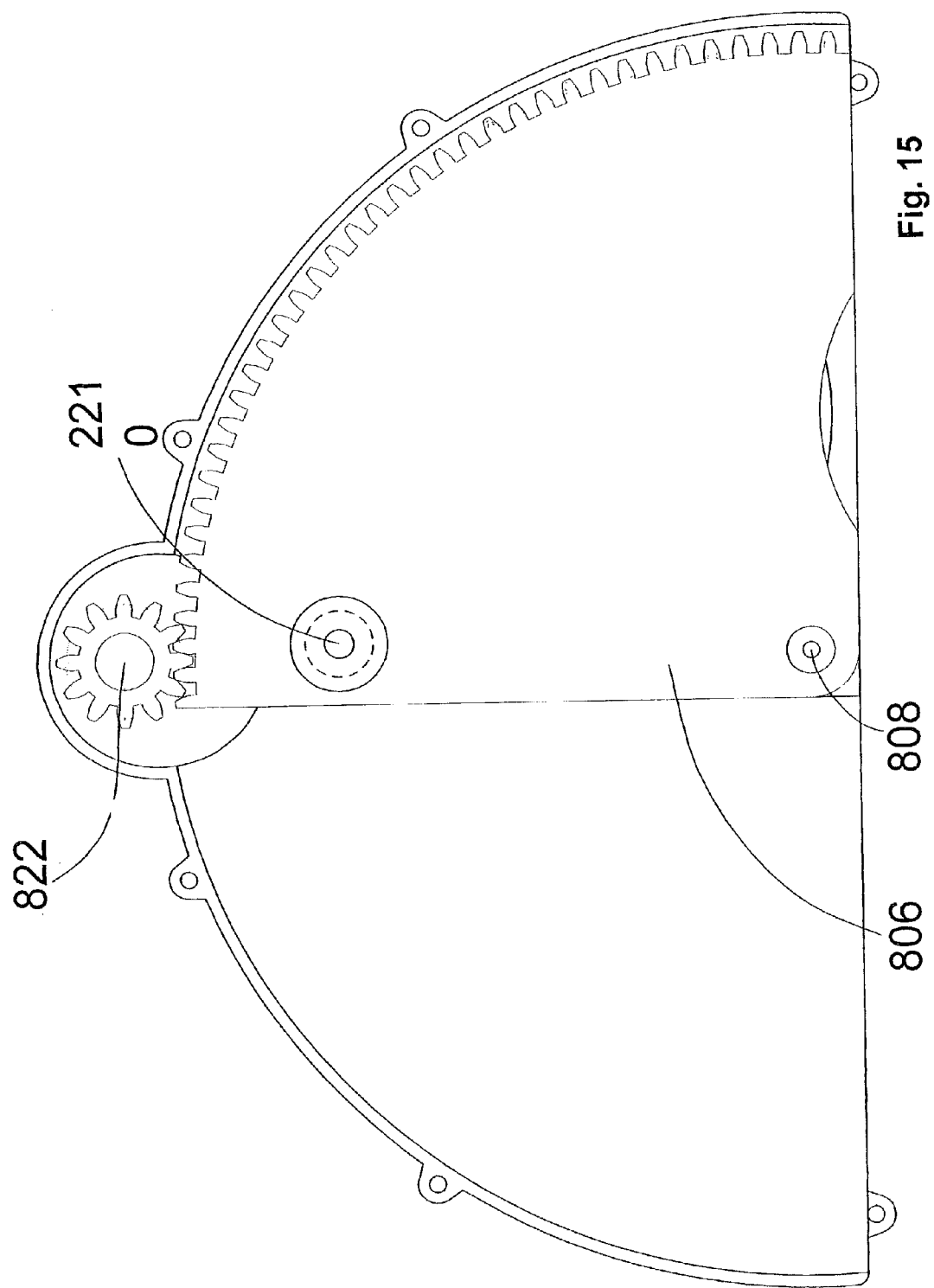
FIG. 15 is a partial plan view of the blast gate shown in FIG. 8 with the blast gate shown in a closed position.

The articulation of the blast gate blade 806 with respect to the fixed pivot point 808 is shown in FIGS. 13, 14, and 15. In FIG. 13, the blast gate 800 is shown with the blade 806 in the open position. This allows gas and debris to flow freely through the aperture 804 in order to collect the dust and other debris that are generated during the manufacturing or other process. To facilitate such passage, the blade 806 is indented with a notch 812 that prevents the blade 806 from obstructing the aperture 804 by conforming to the perimeter of the aperture 804. FIG. 14 shows the blast gate blade 806 in a partially closed position. FIG. 15 shows the blast gate blade 806 in the closed position. Despite the presence of the crescent notch 812, the blade 806 fully closes the aperture 804.

Figure 16:
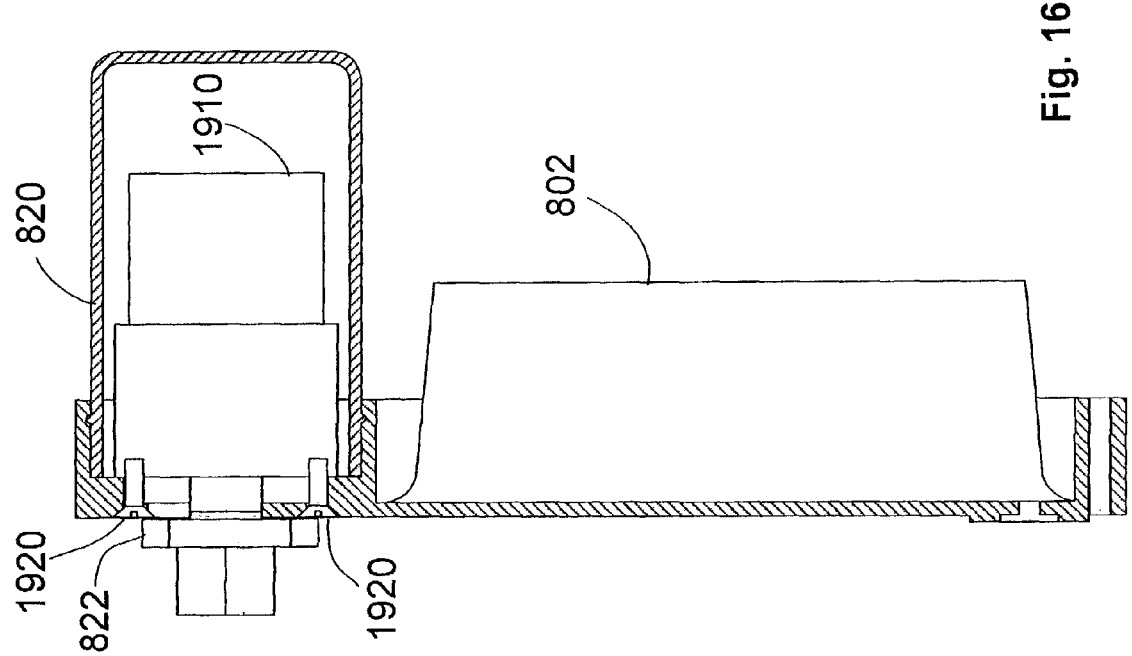
FIG. 16 is a side sectional and partial cutaway view of the blast gate motor shown in FIG. 8.
Figure 18:
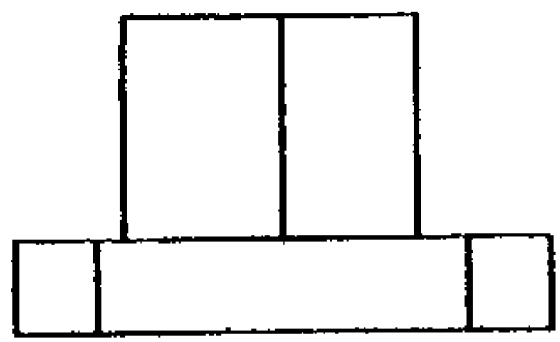
FIG. 18 is a side elevational view of the gear shown in FIG. 17.
Figure 17:
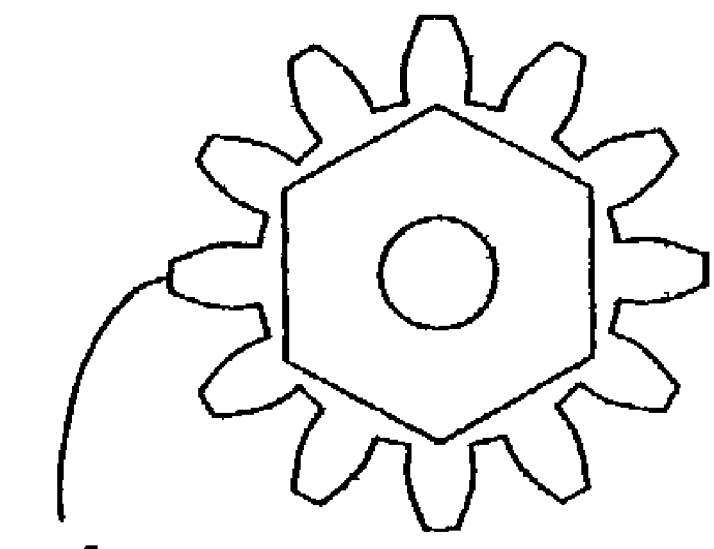
FIG. 17 is a plan view of the gear used to engage the blast gate blade.

FIGS. 16 shows aspects of the motor assembly 820 and FIGS. 17 and 18 show the driving gear 822. In FIG. 16, the gear motor may be a 24 volt DC gear motor that is affixed as by screws 1920 to a rear motor holder plate or the blast gate shell 802. A spindle or rod generally projects centrally from the gear motor 1910 and engages the driving gear 822. The driving gear 822 (FIG. 17) may be held between the front and rear motor holder plates or the front and rear parts of the blast gate shell 802 in engagement with the perimeter teeth 810 of the blast gate blade 806. The motor spindle projects outwardly from the driving gear 822 into an aperture present in the front motor holder plate or front blast gate shell 802 so that the lateral movement of the spindle is generally restricted should lateral spindle movement occur between the gear motor 1910 and the front motor holder plate or gate shell 802. This holds the driving gear 822 in a relatively stable position, and the motor assembly 820 as a whole may then move laterally with respect to the blast gate blade 806 should it be pushed away from the blade 806 by some force. Nut and bolt assemblies 1940 may fixedly hold the front and rear motor holder plates together, if such holder plates are used. Spacers may also be used to hold such motor holder plates apart.

The low-friction slip washer 1010 (FIG. 19) may have a variety of embodiments, with some differentiation taking place in the width of certain materials used in the low-friction slip washers 1010. A narrow perimeter strip may be used or a wider perimeter strip 2210 may be used.

Of note in the embodiment of the blast gate 800 shown in FIG. 8 is its streamlined and attractive shape. Supporting and/or decorative struts or ridges 2302 are shown as radiating from the aperture 804. Additionally, a decorative or protective plate 2304 is attached to one side of the gate valve 800. A logo or the like 2306 may be present in printed, embossed, or other form on the plate 2304.

In conjunction with the present invention, the vacuum system ultimately responsible for airflow and movement may be controlled by a power regulation system, such as power supply unit 140 (FIG. 6). This power regulation system may be incorporated into the central controller 32 or separate therefrom. The power regulation system enables the vacuum motor to operate at different levels of power according to the needs and/or requirements of the system. In FIGS. 6 and 7, the power supply may be selectably controlled by the power regulation system in order to drive the vacuum motor at different levels of operation. According to the demands made on the system, significant energy savings can be realized as the vacuum motor does not have to operate at full power whenever it is used. The variable speed driving of the dust collector motor provided by the power regulator arises from the power regulator's changing and converting incoming energy to the correct frequency and supplies the motor of the dust collector with an appropriate amount of energy to run in a more efficient manner.

Of importance in the present invention is the sufficient airflow by which the dust and other debris may be collected. As an example, for sawdust, an air velocity of approximately 4,000 to 4,500 feet per minute (FPM) is required. Generally, air velocity must not drop below 4,000 FPM to ensure that debris does not settle out of the air stream and collect on the bottom of any duct work 18 that is used to conduct the debris out of the collection area. The system set forth herein maintains minimum airflow by opening additional gates if the number of running work stations (and corresponding associated gates) is lower than (for example) 30% of all workstations. By opening the additional gates, more airflow is allowed through the ductwork 34 in order to maintain the minimum airflow standard. The minimum number of workstations or percentage thereof may change as appropriate from system to system.

By reducing the energy needed to efficiently run the present invention, significant savings can be made that may be enhanced by local power utilities that give credit for energy-saving systems. The present system also allows the purchase of a vacuum system that generally does not run at full power, and it then becomes easier to maintain and keep running such a system as the excessive power capacity provided enables the system to run more efficiently while allowing peak usage to occur when necessary.

As an alternative embodiment to the present invention, communication between central controllers and the blast gates may occur via a number of routes. Wireless, serial, or other digital form of communication may take place according to system requirements or options in order to control the blast gates. Additionally, the use of a computer connection as by an RS-232, RS-485, Ethernet, USB, IEEE 1394 (aka Firewire and/or i.Link), or other connection allows the current system to be monitored and controlled via a personal computer or other similar machine. An additional embodiment may include the communication and control of the dust collection system 30 by remote location as through a personal computer (PC) or other information processing machine in connection with the internet. Such a system (appropriately configured) could be considered an IP (Internet Protocol) enabled system which would connect the central processor 32 to the internet and allow communication with the system from a remote location mediated by TCP/IP protocol. Certain security measures may be in place to prevent mischievous or inadvertent control of the system.

The motor assembly with spring attachment allows for manual retraction, as well as quick disconnection capability so that the blast gate may be subject to manual override and manual opening and closing. Limits which may be present on the blast gate 806 in any number of embodiments include standard limit switches and electronic limit switches.

Energy losses are significant where manual blast gates are used or where blast gates are not installed at all. Manual blast gates are often left in an open position which, when the system is activated, unnecessarily make vacuum demands upon the vacuum system. The present invention remedies this problem by operating in a fully automatic manner with the help of electronically-controlled blast gates in a central control system.

In a typical factory, only approximately 50% of the machinery is in operation at any one time. Demands of technological processes often create unproductive periods in certain machines, giving rise to certain dormant periods in machinery during the work day or work cycle. Often, dust collection vacuum is supplied all the time to all gates in the system. The amount of wasted energy can be up to 80% of the energy that is used for dust collecting. By saving this 80%, not only are cost savings are realized, but the initial production of energy needed for such dust collection is conserved, thereby aiding the environment.

There are basic physical laws to airflow in fan-driven systems. These laws are known as affinity laws or "fan laws." These are as follows:

Affinity Law #1, the quantity of air volume (CFM), varies as fan speed (RPM).

$$LAW\ \#1\ \frac{CFM_2}{CFM_1} = \frac{RPM_2}{RPM_1}$$

Affinity Law #2 states that pressure (P) varies as the square of the fan speed (RPM).

$$LAW\ \#2\ \frac{P_2}{P_1} = \frac{RPM_2^2}{RPM_1^2}$$

Affinity Law #3, the horsepower (HP), varies as the cubed, or third power, of the fan speed (RPM).

$$LAW\ \#3\ \frac{HP_2}{HP_1} = \frac{RPM_2^3}{RPM_1^3}$$

From these laws, it can be seen that if the total amount of air drawn through a vacuum system is reduced by 50%, then only 12.5% of the previous energy suction is needed to run the motor for the ventilator. This is a savings, or reduction, of 87.5% and indicates the dramatic savings and energy that can be achieved by the implementation of the present system.

Generally, every dust collecting system has a "ducting operating point" which is the anticipated and most probably air volume (generally in cubic feet per minute, CFM). Such mean ducted volume may occur, for example, where of 80 workstations, only 40 workstations cut material for most of the time (such as up to 90% of the time). This peak position, or ducting operating point, varies from facility to facility but generally always exists due to the common activities generally performed in the factory or insulation. Different machines may work and generate dust or particles during the day, but the overall number of working machines may fluctuate minimally. The overall probability of use of the machines in the installation is generally a stable number and that stable number is used in the calculation of the specific ducting sizes.

Necessary duct sizes are calculated based on the ducting operating point as the duct collection system 30 runs most of the time at this point. Because the number of workstations cutting material/generating dust is generally lower than the number of all possibly workstations, the resulting necessary air volume is lower than for a more classical design which would enable all the machines to run all time and for the ductwork to collect all of the dust generated. Such resulting duct sizes are generally smaller than in such a classical design and allows the implementation of blast gates to regulate the air volume and flow through the system while still maintaining the correct air volume through the ductwork 18.

While the present invention has been described with regards to particular embodiments, it is recognized that additional variations of the present invention may be devised without departing from the inventive concept.

What is claimed is:

1. A particle collecting system that saves energy due to reduced energy use, comprising:
   a vacuum system, said vacuum system collecting particles by air flow created by reduced pressure drawn by said vacuum system;
   a ductwork system, said ductwork system coupled to said vacuum system and transmitting said reduced pressure to a first particle collection point;
   a first blast gate, said first blast gate coupled to said ductwork system, said blast gate controlling transmission of said reduced pressure and said air flow to said first particle collection point;
   said first blast gate having:
      1) a blast gate blade for selectably obstructing fluid flow, said blast gate blade pivoting on an axis and having teeth at a perimeter distal to said axis; and
      2) a motor assembly, said motor assembly having a driving gear engaging said blade teeth; whereby
      3) selectable activation of said motor assembly controls disposition of said blade with respect to said axis, opening and closing said first blast gate by rotation of said driving gear;
   a first sensor, said first sensor capable of sensing activity of a first machine generally creating particles when active;
   a power controller, said power controller coupled to said vacuum system and controlling activity of said vacuum system, said power controller increasing activity of said vacuum system when additional vacuum power is needed and decreasing activity of said vacuum system when less vacuum power is needed;
   a system controller, said system controller coupled to said first blast gate, said first sensor, and said power controller, said system controller controlling operation of said first blast gate, said system controller receiving machine-activity signals of said first sensor, said system controller coupled to said power controller and controlling activity of said power controller; and
   a blast gate blade travel limiting system limiting the continued travel of said blast gate blade such that said blast gate blade ceases turning when it reaches a fully closed or fully open position and said blast gate blade ceases turning when it is obstructed, said blast gate blade travel limiting system including a biasing system, said biasing system biasing said motor assembly proximate said blast gate blade, said biasing system biasing said driving gear to engage said blade teeth, said biasing system allowing temporary disengagement of said driving gear from said blade teeth; such that said blast gate blade may be manually adjusted, manually opened, and manually closed with said motor assembly urged to reengage said blast gate blade by said biasing system; whereby
   said vacuum system is activated in a limited manner to a degree required to ensure proper particle collection, said limited activation of said vacuum system generally avoiding an "always full on" condition of said vacuum system and reducing energy used by said vacuum system to collect particles.

2. A particle collecting system that saves energy due to reduced energy use as set forth in claim 1, further comprising:
   said air-velocity being maintained at 4000–4500 feet per minute (FPM).

3. A particle collecting system that saves energy due to reduced energy use as set forth in claim 1, wherein said blast gate blade travel limiting system further comprises:
   an electronic clutch coupled to said first blast gate, said electronic clutch sensing load upon said motor assembly and causing said motor assembly to operate according said load sensed by said electronic clutch.

4. A particle collecting system that saves energy due to reduced energy use as set forth in claim 1, wherein said biasing system further comprises:
   a first spring.

5. A particle collecting system that saves energy due to reduced energy use as set forth in claim 1, wherein said first blast gate further comprises:
   a blast gate shell, said blast gate shell coupled to said blast gate blade, said blast gate shell defining an aperture through which air may travel, said air travel through said aperture controlled by said blast gate blade, said aperture having a large size and allowing a large volume of air to travel therethrough.

6. A particle collecting system that saves energy due to reduced energy use as set forth in claim 5, further comprising:
   said aperture having a diameter of at least twelve (12) inches.

7. A particle collecting system that saves energy due to reduced energy use as set forth in claim 1, further comprising:
   said first sensor selected from the group consisting of piezoelectric sensors, toroidal sensors, current sensors, voltage sensors, limit switches, hall sensors, magnets, magnetic sensors, vibration sensors, and energy use sensors.

8. A blast gate for use in controlling fluid flow, including gas flow, comprising:
   a blast gate blade for selectably obstructing fluid flow, said blast gate blade pivoting on an axis and having teeth at a perimeter distal to said axis;
   a motor assembly, said motor assembly having a driving gear engaging said blade teeth; and
   a blast gate blade travel limiting system limiting the continued travel of said blast gate blade such that said blast gate blade ceases turning when it reaches a fully closed or fully open position and said blast gate blade ceases turning when it is obstructed, said blast gate blade travel limiting system including a biasing system, said biasing system biasing said motor assembly proximate said blast gate blade, said biasing system biasing said driving gear to engage said blade teeth, said biasing system allowing temporary disengagement of said driving gear from said blade teeth such that said blast gate blade may be manually adjusted, manually opened, and manually closed with said motor assembly urged to reengage said blast gate blade by said biasing system; whereby
   selectable activation of said motor assembly controls, disposition of said blade with respect to said axis, opening and closing said first blast gate by rotation of said driving gear.

9. A blast gate for use in controlling fluid flow, including gas flow, as set forth in claim 8, wherein said blast gate blade travel limiting system further comprises:

an electronic clutch coupled to said first blast gate, said electronic clutch sensing load upon said motor assembly and causing said motor assembly to operate according said load sensed by said electronic clutch.

10. A blast gate for use in controlling fluid flow as set forth in claim 8, wherein said biasing system further comprises: a first spring.

11. A blast gate for use in controlling fluid flow as set forth in claim 8, wherein said first blast gate further comprises: a blast gate shell, said blast gate shell coupled to said blast gate blade, said blast gate shell defining an aperture through which fluid may travel, said fluid travel through said aperture controlled by said blast gate blade, said aperture having a large size and allowing a large volume of fluid to travel therethrough.

12. A blast gate for use in controlling fluid flow as set forth in claim 11, further comprising: said aperture having a diameter between four (4) to twenty (20) inches or larger.

13. A blast gate for use in controlling fluid flow, including gas flow, comprising:
a blast gate blade for selectably obstructing fluid flow, said blast gate blade pivoting on an axis and having teeth at a perimeter distal to said axis; and
a motor assembly, said motor assembly having a driving gear engaging said blade teeth
a blast gate blade travel limiting system limiting the continued travel of said blast gate blade such that said blast gate blade ceases turning when it reaches a fully closed or fully open position and said blast gate blade ceases turning when it is obstructed, said blast gate blade travel limiting system including a biasing system, said biasing system biasing said motor assembly proximate said blast gate blade, said biasing system biasing said driving gear to engage said blade teeth, said biasing system allowing temporary disengagement of said driving gear from said blade teeth such that said blast gate blade may be manually adjusted, manually opened, and manually closed with said motor assembly urged to reengage said blast gate blade by said biasing system;
a blast gate shell, said blast gate shell coupled to said blast gate blade, said blast gate shell defining an aperture through which fluid may travel, said aperture having a diameter of at least twelve (1.2) inches, said fluid travel through said aperture controlled by said blast gate blade, said aperture having a large size and allowing a large volume of fluid to travel therethrough; whereby
selectable activation of said motor assembly controls disposition of said blade with respect to said axis, opening and closing said first blast gate by rotation of said driving gear.

14. An automatic machine shop vacuum system, comprising:
a dust collector, said dust collector creating a vacuum;
at least one machine, said machine generating dust or shavings to be collected by said dust collector, said machine coupled to said, dust collector by a duct, said duct transmitting vacuum pressure to said machine;
a blast gate valve, said blast gate valve coupled to said duct and selectably controlling transmission of said vacuum pressure to said machine;
said blast gate having:
1) a blast gate blade for selectably obstructing fluid flow, said blast gate blade pivoting on an axis and having teeth at a perimeter distal to said axis; and
2) a motor assembly, said motor assembly having a driving gear engaging said blade teeth such that selectable activation of said motor assembly controls disposition of said blade with respect to said axis, opening and closing said blast gate by rotation of said driving gear;
(3) a chassis, said chassis connectable to vacuum system duct work, said chassis defining a flow channel through which the vacuum pressure is transmitted, said chassis defining a central gap, said central gap extending outwardly away from said flow channel;
(4) said blast gate blade being a rotating blade, said rotating blade pivotably coupled to said chassis, said rotating blade having teeth at its perimeter, said rotating blade traveling within said central gap, said rotating blade having an optimal teardrop or pear shape for conserving materials and providing a lightweight and effective occlusion blade and so that a majority of said rotating blade serves as an occluding portion of said occlusion blade for the blast gate valve, said rotating blade passing entirely through said gap so that said rotating blade extends past a perimeter of said flow channel to better occlude transmission of vacuum pressure;
(5) an air inlet, said air inlet defined by said chassis adjacent said flow channel, said air inlet interconnecting an environment external to said chassis with said central gap whereby debris such as dust, shavings, and the like are kept clear of said central gap by airflow through said air inlet when vacuum pressure is transmitted by the blast gate valve, said air inlet optimally positioned so that it intersects said central gap adjacent said rotating blade at a widest point of said rotating blade when the blast gate valve is closed;
(6) a semi-circular cut out section, said semi-circular cut out section defined by said chassis and spaced apart from said flow channel, said semi-circular cut out section allowing manual access to said rotating blade while reducing weight and materials required of said chassis;
(7) a DC motor, said DC motor coupled to said chassis and said rotating blade whereby said motor may rotate said rotating blade with respect to said chassis by engagement of said perimeter teeth, polarity of current supplied to said DC motor controlling a direction of rotation of said rotating blade;
(8) a washer, said washer coupled to one side of said chassis and coaxial with a drive shaft of said motor;
(9) a spring washer, said spring washer coupled to another side of said chassis and coaxial with said drive shaft; and
(10) a nut, said nut engaging said drive shaft adjacent said spring washer and holding said spring washer against said rotating blade, said washers forming a slip clutch so that said rotating blade is urged against said washer by said spring washer sufficient to hold said rotating blade in place with respect to said drive shaft when said rotating blade is free to turn, yet insufficient to hold said rotating blade in place with respect to said drive shaft when said rotating blade is not free to turn; whereby
said rotating blade may pivotably rotate to selectably occlude said flow channel thereby opening and closing the blast gate valve;

a sensor, said sensor coupled to said machine and transmitting a signal when said machine is on that is different from a signal transmitted by said sensor when said machine is off; and a controller, said controller coupled to said dust collector, said blast gate valve, and said sensor, said controller operating said dust collector in a regulated manner sufficient to collect dust and said controller operating said blast gate valve in response to said sensor signals; whereby dust generated by said machine during a machining process is automatically collected by said dust collector when said machine is turned on, said controller energizing said dust collector sufficient to collect said dust and opening said blast gate valve in response to sensor signals indicating the operation of said machine, said controller de-energizing said dust collector and closing said blast gate valve in response to sensor signals indicating the non-operation of said machine, said controller saving energy by limiting operation of said dust collector to supply necessary, but not excessive, vacuum power sufficient to collect dust.

15. The automatic machine shop vacuum system of claim 14, wherein said sensor is a sensor selected from the group consisting of:

piezoelectric sensors, toroidal sensors, current sensors, voltage sensors, limit switches, hall sensors, magnets, magnetic sensors, vibration sensors, and energy use sensors.

16. A blast gate valve for controlling transmission of vacuum pressure in a machine shop vacuum system, comprising:

a chassis, said chassis connectable to vacuum system duct work, said chassis defining a flow channel through which the vacuum pressure is transmitted, said chassis defining a central gap;

a rotating blade for selectably obstructing fluid flow, said rotating blade having teeth about a perimeter, said rotating blade pivotably coupled to said chassis, said rotating blade traveling within said central gap; and a rotating blade travel limiting system limiting the continued travel of said rotating blade such that said rotating blade ceases turning when it reaches a fully closed or fully open position and said rotating blade ceases turning when it is obstructed, said rotating blade travel limiting system including a biasing system, said biasing system adapted to bias a motor assembly proximate said rotating blade, said biasing system adapted for biasing a driving gear to engage said teeth, said biasing system allowing temporary disengagement of said driving gear from said teeth such that said rotating blade may be manually adjusted, manually opened, and manually closed with said motor assembly urged to reengage said rotating blade by said biasing system; whereby said rotating blade may pivotably rotate to selectably occlude said flow channel thereby opening and closing the blast gate valve; and wherein said chassis further comprises an air inlet, said air inlet defined by said chassis and adjacent said flow channel, said air inlet interconnecting an environment external to said chassis with said central gap; whereby debris such as dust, shavings, and the like are kept clear of said central gap by airflow through said air inlet when vacuum pressure is transmitted by the blast gate valve.

17. The blast gate valve of claim 16, wherein said air inlet is optimally positioned to keep debris clear of said central gap.

18. The blast gate valve of claim 17, wherein said air inlet is positioned so that it intersects said central gap adjacent said rotating blade at a widest point of said rotating blade when the blast gate valve is closed.

\* \* \* \* \*